US009749457B2

(12) United States Patent
Vendrow et al.

(10) Patent No.: US 9,749,457 B2
(45) Date of Patent: Aug. 29, 2017

(54) PROVISIONING INTERFACES FOR ACCESSING VIRTUAL PRIVATE BRANCH EXCHANGE SERVICES THROUGH A MOBILE DEVICE

(71) Applicant: RingCentral, Inc., San Mateo, CA (US)

(72) Inventors: Vlad Vendrow, Redwood Shores, CA (US); Vladimir Shmunis, South Lake Tahoe, CA (US); Vi Chau, San Francisco, CA (US); Praful Shah, Los Altos Hills, CA (US); Natalie Nayberg, San Carlos, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/605,718

(22) Filed: Jan. 26, 2015

(65) Prior Publication Data
US 2015/0133113 A1    May 14, 2015

Related U.S. Application Data

(63) Continuation of application No. 14/449,416, filed on Aug. 1, 2014, now Pat. No. 8,971,957, which is a
(Continued)

(51) Int. Cl.
*H04W 88/06* (2009.01)
*H04M 1/725* (2006.01)
(Continued)

(52) U.S. Cl.
CPC ....... *H04M 1/72563* (2013.01); *H04M 1/006* (2013.01); *H04M 3/42* (2013.01);
(Continued)

(58) Field of Classification Search
CPC ......... H04M 3/42314; H04M 3/42323; H04M 3/546; H04M 2201/42; H04M 1/72563;
(Continued)

(56) References Cited

U.S. PATENT DOCUMENTS 5,841,854 A    11/1998  Schumacher et al.
6,249,576 B1   6/2001   Sassin et al.
(Continued)

FOREIGN PATENT DOCUMENTS

EP    1 087 600    3/2001
EP    1 383 299    1/2004
(Continued)

OTHER PUBLICATIONS

Authorized officer Wooncheol Hwang, International Search Report and Written Opinion in PCT/US2010/058569, mailed Aug. 18, 2011, 8 pages.
(Continued)

*Primary Examiner* — Kamran Afshar
*Assistant Examiner* — Farid Seyedvosoghi
(74) *Attorney, Agent, or Firm* — Fish & Richardson P.C.

(57) ABSTRACT

Systems, methods and computer program products for facilitating the provisioning of a single and multi-line virtual private branch exchange (PBX) including automated call distribution via a mobile device are described. In some implementations, the provisioning of the single and multi-line virtual PBX can be achieved using one or more unique provisioning interfaces. The unique provisioning interfaces can enable the setup and configuration of a virtual PBX service account instantaneously from any geographical location at any time. Changes made to the virtual PBX service account can be immediately reflected back (e.g., in real-time) to the system providing the core operating environment.

20 Claims, 12 Drawing Sheets

Related U.S. Application Data continuation of application No. 12/690,031, filed on Jan. 19, 2010, now Pat. No. 8,838,169.

(51) Int. Cl.
| | |
|---|---|
| *H04M 3/54* | (2006.01) |
| *H04W 4/00* | (2009.01) |
| *H04M 1/00* | (2006.01) |
| *H04M 3/42* | (2006.01) |
| *H04M 3/46* | (2006.01) |
| *H04M 3/436* | (2006.01) |

(52) U.S. Cl.
CPC ..... *H04M 3/4234* (2013.01); *H04M 3/42161* (2013.01); *H04M 3/54* (2013.01); *H04M 3/546* (2013.01); *H04W 4/00* (2013.01); *H04M 3/42314* (2013.01); *H04M 3/436* (2013.01); *H04M 3/46* (2013.01); *H04M 2207/18* (2013.01)

(58) Field of Classification Search
CPC .... H04M 3/42161; H04M 1/006; H04M 3/42; H04M 3/4234; H04M 3/54; H04M 3/436; H04M 3/46; H04M 2207/18; H04Q 2213/1322; H04W 4/00; H04W 88/06
USPC .......... 455/426.1, 73, 90.1–90.3, 550.1, 555, 455/405, 435, 417, 428, 414.1; 379/419–440; 370/419–440
See application file for complete search history.

(56) References Cited

U.S. PATENT DOCUMENTS

| | | | |
|---|---|---|---|
| 6,393,017 B1* | 5/2002 | Galvin | H04M 3/00 370/352 |
| 6,445,920 B1 | 9/2002 | Pfundstein | |
| 6,587,555 B1 | 7/2003 | Cripe et al. | |
| 6,775,272 B2 | 8/2004 | Galvin et al. | |
| 7,006,614 B2 | 2/2006 | Feinberg et al. | |
| 7,031,437 B1 | 4/2006 | Parsons et al. | |
| 7,099,445 B2 | 8/2006 | Creamer et al. | |
| 7,123,608 B1* | 10/2006 | Scott | H04M 3/2218 370/353 |
| 7,248,577 B2 | 7/2007 | Hakusui | |
| 7,254,643 B1 | 8/2007 | Peters, Jr. et al. | |
| 7,313,106 B2 | 12/2007 | Steinberg | |
| 7,317,788 B2 | 1/2008 | Caspi et al. | |
| 7,440,561 B2 | 10/2008 | Forte | |
| 7,454,195 B2 | 11/2008 | Lewis et al. | |
| 7,496,091 B2 | 2/2009 | Galvin et al. | |
| 7,518,984 B2 | 4/2009 | Koyama | |
| 7,542,780 B2 | 6/2009 | Höglander et al. | |
| 7,567,662 B1 | 7/2009 | Renner et al. | |
| 7,602,895 B2 | 10/2009 | Terry et al. | |
| 7,603,379 B2 | 10/2009 | Kang et al. | |
| 7,640,293 B2 | 12/2009 | Wilson et al. | |
| 7,746,848 B2 | 6/2010 | Hakusui | |
| 7,756,255 B1 | 7/2010 | Santharam et al. | |
| 7,844,666 B2 | 11/2010 | Horvitz et al. | |
| 7,885,399 B2 | 2/2011 | Abramson et al. | |
| 7,940,702 B1 | 5/2011 | Donley et al. | |
| 7,958,099 B2 | 6/2011 | Kang et al. | |
| 7,966,385 B2 | 6/2011 | Netravali et al. | |
| 7,974,618 B2 | 7/2011 | Silver | |
| 7,996,473 B2 | 8/2011 | Braam | |
| 8,001,181 B2 | 8/2011 | Wilson et al. | |
| 8,130,931 B2 | 3/2012 | Murphy et al. | |
| 8,438,485 B2 | 5/2013 | Kulis et al. | |
| 8,467,354 B1* | 6/2013 | Jerkunica | H04L 65/1053 370/338 |
| 8,838,169 B2 | 9/2014 | Vendrow et al. | |
| 8,965,409 B2 | 2/2015 | Abhyanker | |
| 9,350,808 B2 | 5/2016 | Beck et al. | |
| 2002/0099633 A1 | 7/2002 | Bray | |
| 2002/0114329 A1 | 8/2002 | Galvin et al. | |
| 2003/0041152 A1 | 2/2003 | Schmeltzle et al. | |
| 2003/0069939 A1 | 4/2003 | Russell | |
| 2004/0028201 A1 | 2/2004 | Huttel et al. | |
| 2004/0160951 A1 | 8/2004 | Galvin et al. | |
| 2004/0202117 A1 | 10/2004 | Wilson et al. | |
| 2004/0202153 A1 | 10/2004 | Koyama | |
| 2004/0243705 A1 | 12/2004 | Netravali et al. | |
| 2005/0048967 A1 | 3/2005 | Höglander et al. | |
| 2005/0165719 A1 | 7/2005 | Greenspan et al. | |
| 2006/0023657 A1 | 2/2006 | Woodson et al. | |
| 2006/0030357 A1 | 2/2006 | McConnell et al. | |
| 2006/0053227 A1 | 3/2006 | Ye et al. | |
| 2006/0116127 A1 | 6/2006 | Wilhoite et al. | |
| 2006/0205436 A1 | 9/2006 | Liu et al. | |
| 2006/0229054 A1* | 10/2006 | Erola | H04M 1/24 455/403 |
| 2007/0019623 A1* | 1/2007 | Alt | H04L 63/0281 370/352 |
| 2007/0047534 A1 | 3/2007 | Hakusui | |
| 2007/0094583 A1 | 4/2007 | Randall et al. | |
| 2007/0111716 A1 | 5/2007 | Leigh et al. | |
| 2007/0123239 A1 | 5/2007 | Leigh et al. | |
| 2007/0153770 A1 | 7/2007 | Goyal et al. | |
| 2007/0206573 A1* | 9/2007 | Silver | H04W 76/022 370/352 |
| 2008/0034060 A1 | 2/2008 | Fisher, Jr. | |
| 2008/0052138 A1* | 2/2008 | Marsh | G06Q 10/06311 705/7.13 |
| 2008/0091454 A1 | 4/2008 | Fisher, Jr. | |
| 2008/0130554 A1 | 6/2008 | Gisby et al. | |
| 2008/0172574 A1 | 7/2008 | Fisher | |
| 2008/0186929 A1 | 8/2008 | Rice et al. | |
| 2009/0029724 A1 | 1/2009 | Hardy et al. | |
| 2009/0054032 A1 | 2/2009 | Ren et al. | |
| 2009/0059818 A1 | 3/2009 | Pickett | |
| 2010/0002626 A1 | 1/2010 | Schmidt et al. | |
| 2010/0046731 A1 | 2/2010 | Gisby et al. | |
| 2010/0056109 A1 | 3/2010 | Wilson et al. | |
| 2010/0080214 A1 | 4/2010 | Li et al. | |
| 2010/0198927 A1 | 8/2010 | Tonnison et al. | |
| 2010/0220714 A1 | 9/2010 | Clark et al. | |
| 2010/0246575 A1 | 9/2010 | Hakusui | |
| 2010/0299719 A1 | 11/2010 | Burks et al. | |
| 2011/0130168 A1 | 6/2011 | Vendrow et al. | |
| 2011/0134804 A1 | 6/2011 | Maes | |
| 2011/0153668 A1 | 6/2011 | Walker et al. | |
| 2011/0177797 A1 | 7/2011 | Vendrow et al. | |
| 2013/0138716 A1 | 5/2013 | Macwan et al. | |
| 2013/0144951 A1 | 6/2013 | Viswanath et al. | |
| 2014/0040445 A1 | 2/2014 | Beckert et al. | |
| 2014/0342711 A1 | 11/2014 | Vendrow et al. | |
| 2016/0234664 A1 | 8/2016 | Vendrow et al. | |

FOREIGN PATENT DOCUMENTS

| | | |
|---|---|---|
| EP | 1 494 429 | 1/2005 |
| EP | 1 608 190 | 12/2005 |
| KR | 10-2006-011583 | 11/2006 |
| WO | WO 00/79826 | 12/2000 |
| WO | WO 2007/025950 | 3/2007 |
| WO | WO 2008/074122 | 6/2008 |

OTHER PUBLICATIONS

Authorized officer Simin Baharlou, International Preliminary Report on Patentability in PCT/US2010/058569, mailed Jun. 5, 2012, 5 pages.

Authorized officer Yeomin Yoon, International Search Report and Written Opinion in PCT/US2010/022075, mailed Feb. 28, 2011, 10 pages.

Authorized officer Simin Baharlou, International Preliminary Report on Patentability in PCT/US2010/022075, mailed Aug. 2, 2012, 7 pages.

European Search Report in EP 10 844 113, mailed Jul. 23, 2013, 3 pages.

(56) References Cited

OTHER PUBLICATIONS

Communication pursuant to Article 94(3) EPC, in EP 10 844 113, mailed Aug. 2, 2013, 6 pages.

* cited by examiner

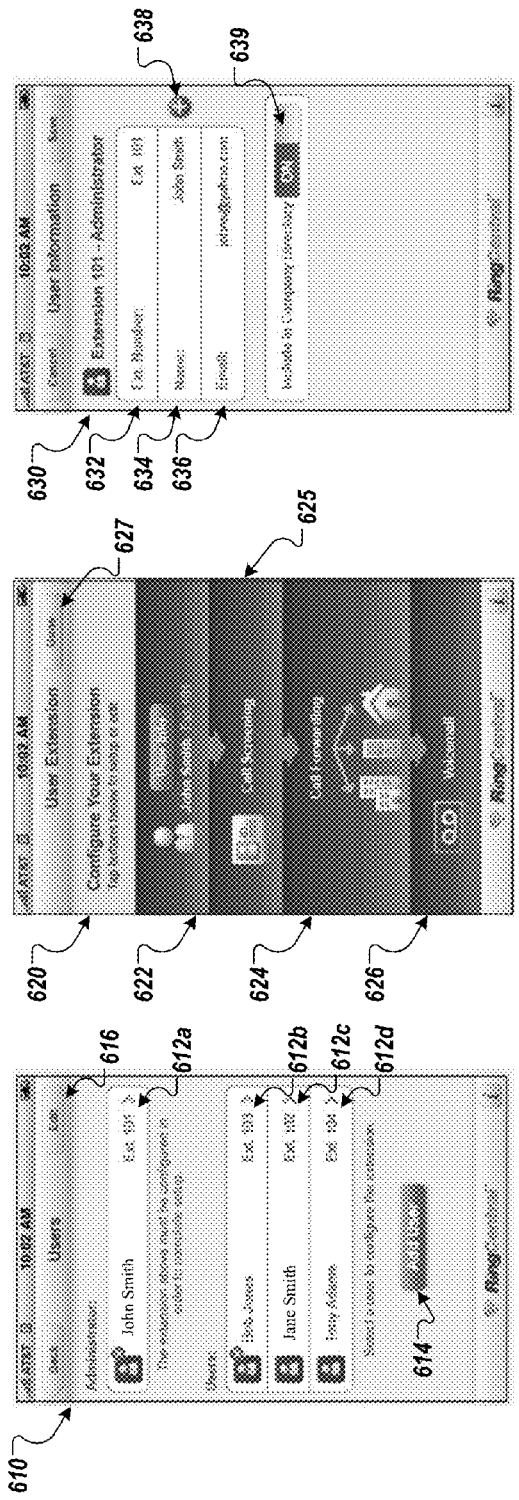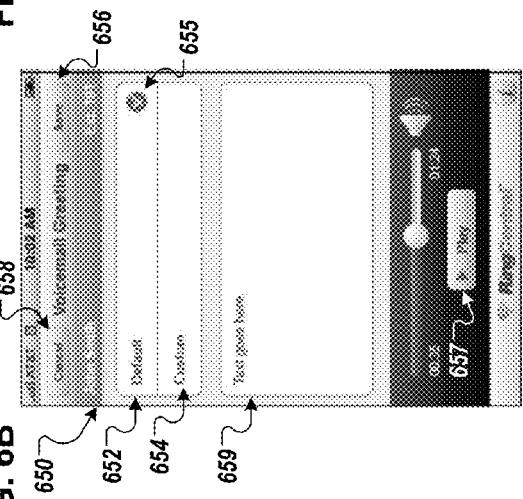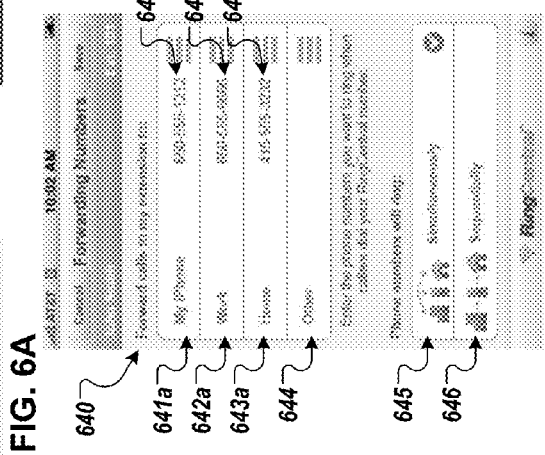

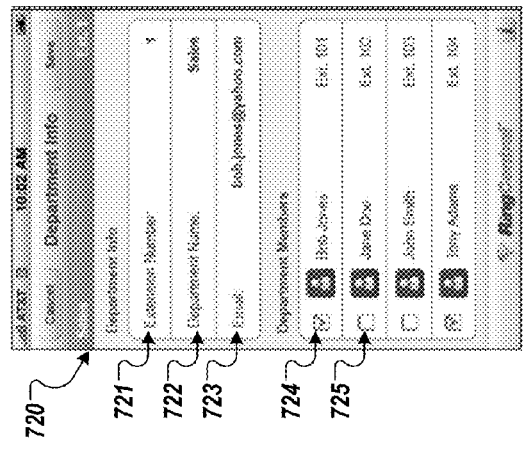
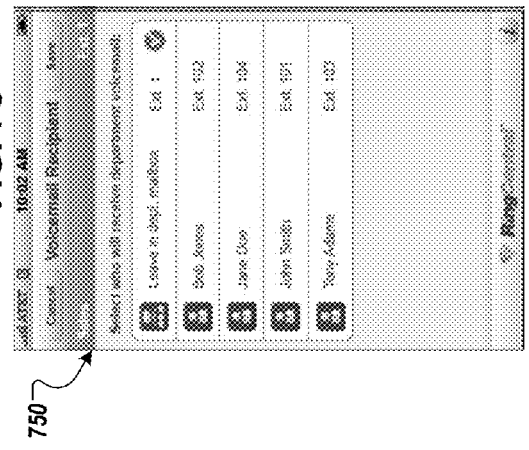
FIG. 7A  FIG. 7B  FIG. 7C
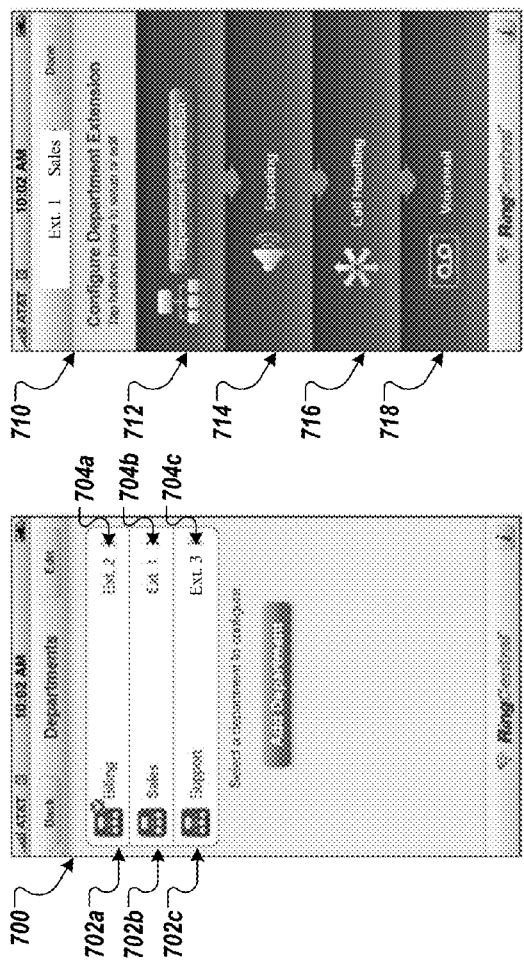
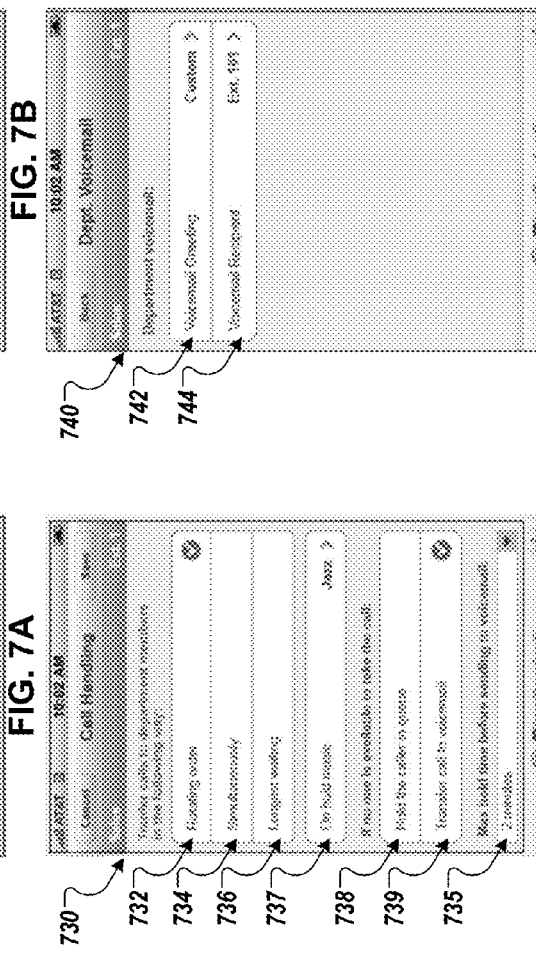
FIG. 7D  FIG. 7E  FIG. 7F

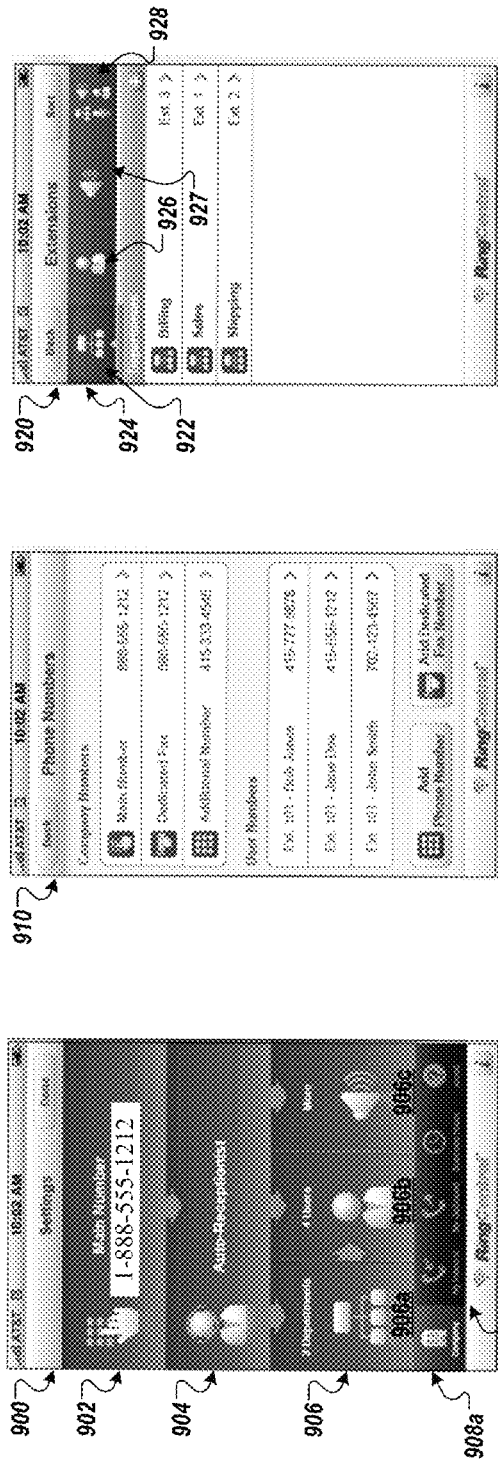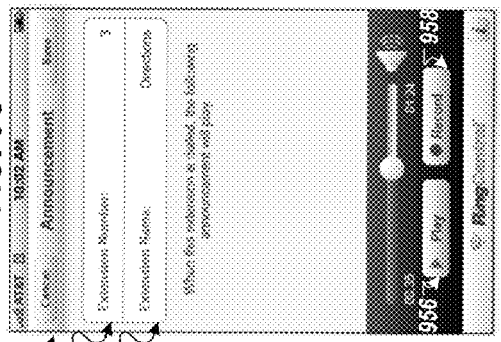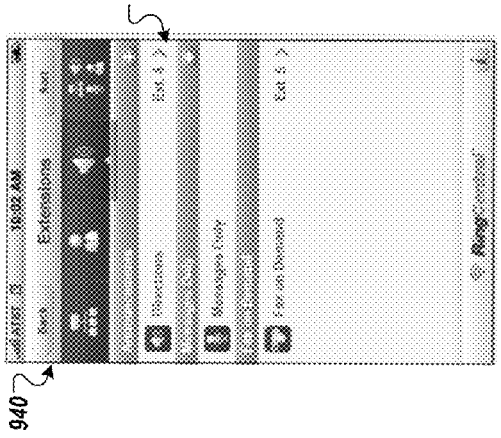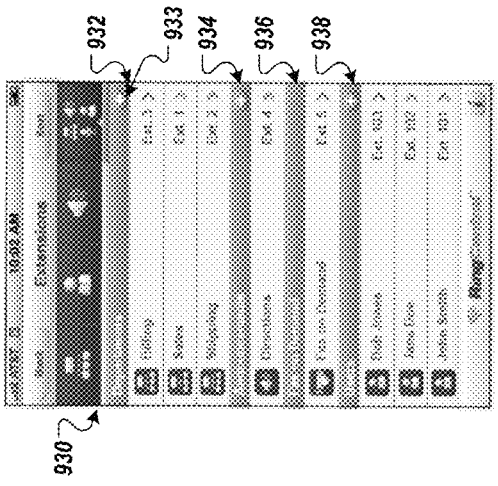

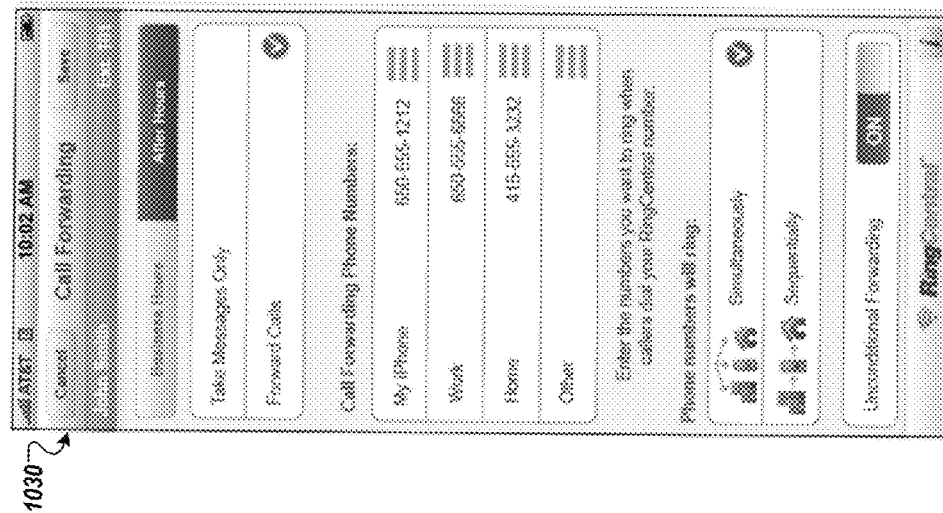
FIG. 10D
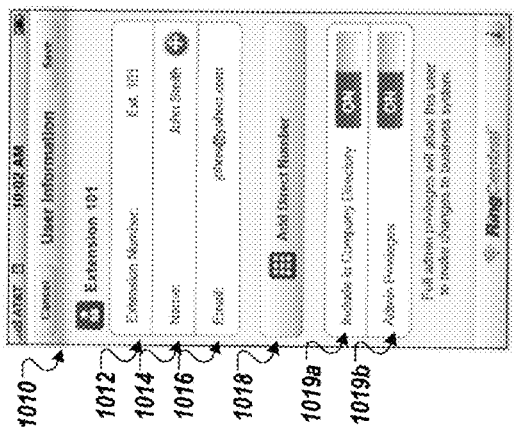
FIG. 10B
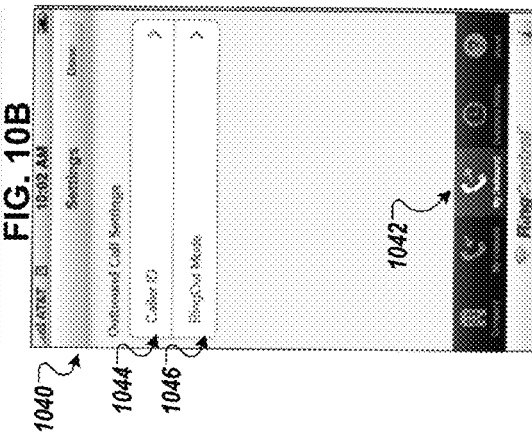
FIG. 10E
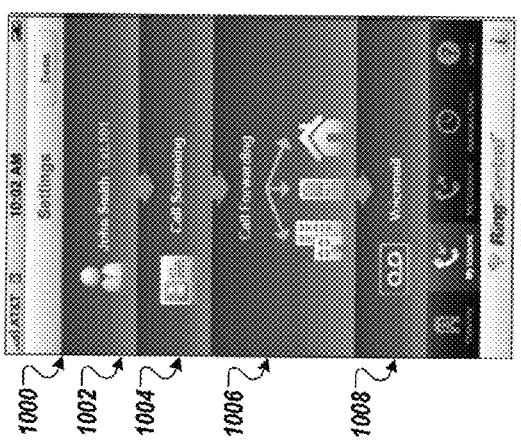
FIG. 10A
FIG. 10C

PROVISIONING INTERFACES FOR ACCESSING VIRTUAL PRIVATE BRANCH EXCHANGE SERVICES THROUGH A MOBILE DEVICE

CROSS-REFERENCE TO RELATED APPLICATIONS

This application is a continuation U.S. application Ser. No. 14/449,416, filed Aug. 1, 2014, which is a continuation of U.S. application Ser. No. 12/690,031, filed Jan. 19, 2010. The entire disclosure of each of the prior applications is hereby incorporated by reference.

TECHNICAL FIELD

This subject matter relates to managing communications for devices.

BACKGROUND

Mobile devices have become an integral part of everyday life for many technology-savvy users. Mobile devices such as Personal Data Assistants (PDAs), mobile phones, media players, and even handheld gaming consoles can provide various communications services, such as email, telephone, and instant messaging. Many mobile devices can also provide video and internet capabilities, such as video conferencing, internet browsing, or data transfer and file sharing. Further, mobile devices can store a wealth of personal and communications data, such as a personal profile, contacts, address book, and personal calendar that users can access at any time, anywhere. Many mobile devices contain additional hardware or sensors to provide location awareness, orientation, state of motion, and information on a given surrounding environment. The network, multimedia, and personal data retention capabilities as well as portability of mobile devices make such devices ideal as a new platform for business telecommunications services that had traditionally been occupied by non-mobile PSTN landlines and computers.

SUMMARY

Systems, methods and computer program products for facilitating the provisioning of a single and multi-line virtual private branch exchange (PBX) including automated call distribution via a mobile device are described. In some implementations, the provisioning of the single and multi-line virtual PBX can be achieved using one or more unique provisioning interfaces. The unique provisioning interfaces can enable the setup and configuration of a virtual PBX service account instantaneously from any geographical location at any time. Changes made to the virtual PBX service account can be immediately reflected back (e.g., in real-time) to the system providing the core operating environment.

In some implementations, a method can be used that includes receiving a user request from a mobile device to configure one or more virtual private branch exchange (PBX) services including receiving configuration data, configuring the one or more virtual PBX services based on the received configuration data, and provisioning a mobile user account associated with the mobile device with the one or more configured virtual PBX services.

In some implementations, a system can be used that includes a data processing apparatus, and a memory in data communication with the data processing apparatus and storing instructions executable by the data processing apparatus and upon such execution cause the data processing apparatus to perform operations comprising: receiving a user request from a mobile device to access a mobile user account pre provisioned with one or more virtual private branch exchange (PBX) services including receiving configuration data for configuring the one or more virtual PBX services, configuring the one or more virtual PBX services based on the received configuration data, and provisioning the mobile user account with the one or more configured virtual PBX services.

In some implementations, a system can be used that includes an interface manager to present a user interface on a mobile device configured to receive user input specifying one or more configuration parameters for configuring one or more call handling rules associated with handling calls made to or received from the mobile device, and an application server to: render one or more virtual private branch exchange (PBX) services to the mobile device, each virtual PBX service defined with the one or more call handling rules and configured based on the one or more configuration parameters, and update the one or more virtual PBX services in real time upon receiving updated configuration parameters from the user interface.

The details of one or more implementations are set forth in the accompanying drawings and the description below. Other features, objects, and advantages of the techniques will be apparent from the description and drawings, and from the claims.

DESCRIPTION OF DRAWINGS

FIG. 6A shows an example of a user summary interface.

FIG. 6B shows an example of an extension user interface.

FIG. 6C shows an example of a user information interface.

FIG. 6D shows an example of a call forwarding interface.

FIG. 6E shows an example of a voicemail greeting interface.

FIG. 7A shows an example of a departments interface.

FIG. 7B shows an example of a department configuration interface.

FIG. 7C shows an example of a department information interface.

FIG. 7D shows an example of a call handling interface.

FIG. 7E shows an example of a department voicemail interface.

FIG. 7F shows an example of a voicemail recipient interface.

FIG. 9A shows an example of a settings interface.

FIG. 9B shows an example of a phone number interface.

FIG. 9C shows an example of an extension interface.

FIG. 9D shows an example of a list.

FIG. 9E shows an example of the extension interface shown in FIG. 9C displaying additional information.

FIG. 9F shows an example of an announcement configuration interface.

FIG. 10A shows an example of a personal setting interface.

FIG. 10B shows an example of a personal user information interface.

FIG. 10C shows an example of a personal call screening interface.

FIG. 10D shows an example of a call forwarding interface.

FIG. 10E shows an example of an outbound interface.

Like reference symbols in the various drawings indicate like elements.

DETAILED DESCRIPTION

Figure 1:
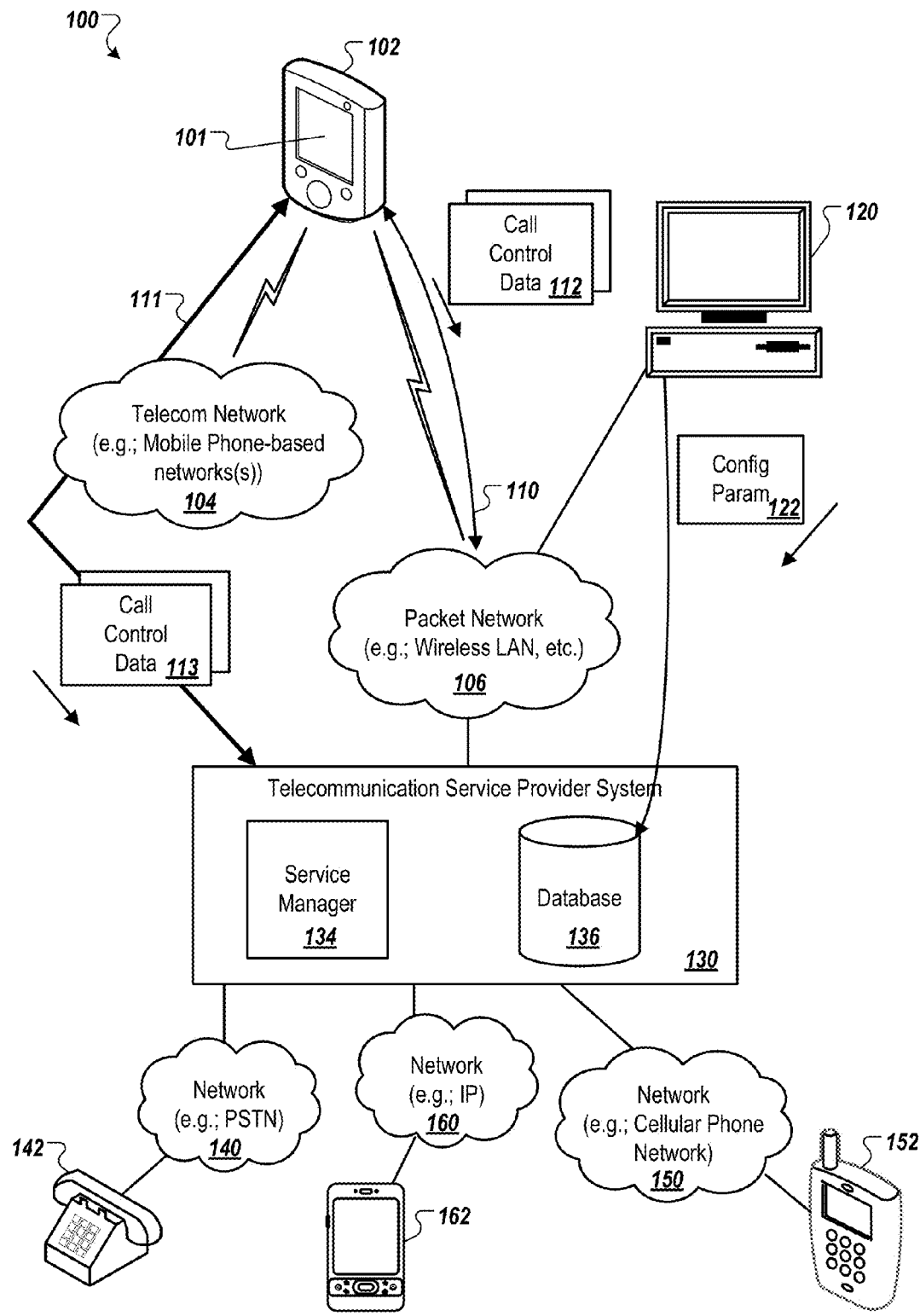
FIG. 1 is a block diagram of a call management system.

As will be described below, a system can be provided that facilitates the provisioning of a single and multi-line virtual private branch exchange (PBX) including automated call distribution (ACD) via a mobile device. In some implementations, the provisioning of the single and multi-line virtual PBX can be achieved using one or more unique provisioning interfaces. For example, the unique provisioning interfaces can enable the setup and configuration of a virtual PBX service account instantaneously from any geographical location at any time. Changes made to the virtual PBX service account can be immediately reflected back (e.g., in real-time) to the system providing the core operating environment.

In some implementations, a user or an administrator can create and configure or manage one or more virtual PBX services associated with a virtual PBX service account (e.g., those provisioned for the account) including, without limitation, a main phone number and additional phone numbers such as a dedicated fax, multiple greeting prompts, call screening rules, forwarding numbers, forwarding rules, voicemail rules, ring-out rules, caller ID rules, business hours, administrative privileges and extension settings such as announcement prompts, ACD rules, and other settings. The user or the administrator can also access user level profiles to manage the respective individual settings that include, without limitation, greeting prompts, call screening rules, forwarding numbers, forwarding rules, voicemail rules, ring-out rules, caller ID rules, business hours and other settings. The virtual PBX service account and associated services can be accessible to users and administrators through, for example, a mobile device, with authorization access managed through, for example, profile credentials. Billing and payment management can be available to account holders, users or system administrators and can be included as part of the initial provisioning process.

Virtual Private Branch Exchange Overview

A private branch exchange ("PBX") is a telephone network that serves a business or office, in contrast to a common carrier. A PBX system can include one or more VOIP servers, a call management program, and a gateway between a data and voice network. A virtual PBX (vPBX) system is a PBX system whose VOIP servers, call management program, and gateway are located remotely from the office or business, typically at a vPBX service provider. A mobile device, such as a cellular mobile device, is a portable device that can wirelessly connect to a data network or a voice network or both. A mobile device typically has a display screen or a keyboard, or both. A mobile device can be of the form of a cellular telephone, a personal digital assistant (PDA), a smart phone, or other portable device that includes a telephony transceiver and the like. An extension is a subtree or branch from a main number assigned in a telephony system. An extension can be assigned to a device, such as a mobile device or landline phone, that is connected to a PBX system. The PBX system operates as a switchboard for the extensions. A user is a person who uses the vPBX system. A call is a connection between a calling party and a called party over a network. The network can include a voice network, a data network (e.g., including fax capability), or both. A caller, or calling party, is a person or device who initiates a call. A callee, or called party, is a person or device who receives a call.

Call Management System Overview

FIG. 1 is a block diagram of a call management system 100. As shown in FIG. 1, the mobile device 102 can be configured to communicate using multiple modes of communication (e.g., "multi-modal channels of communication"). The network 104 can operate in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and other communications protocols such as Session Initiation Protocol. The network 106 can operate in accordance with a second mode of communication. Examples of the second mode of communication can include VOIP phone technologies, wireless LAN technologies (e.g., telephone technologies/standards, such as WiMAX and any other IEEE 802.xx-based technologies/standards). Any number of modes is possible.

The mobile device 102 can be configured to interact with a telecommunication service provider (TSP) system 130 over a call control communications channel, which in some implementations can be a broadband call control channel 110. In some implementations, the broadband call control channel 110 can be established in the network 106 (e.g., in the same or separate channel used to convey voice/video data, such as in a Session Initiation Protocol ("SIP") message). In some implementations, another narrowband call control channel 111 can be established in the network 104 (e.g., a mobile operator can provide in the same or separate channel used to convey voice/video data, such as in an Short Message Service ("SMS") message). The mobile device 102 and/or the TSP system 130 can be configured to establish narrowband call control channel 111 and/or broadband call control channel 110 so that the mobile device 102 and/or the TSP system 130 can transmit and/or receive the call control data 113 (over the narrowband call control channel 111) and/or call control data 112 (over the broadband call control channel 110).

The TSP system 130 can be configured to effect a number of call controlling functions that can be performed remotely from the mobile device 102. For example, the TSP system 130 can perform call control operations in association with a first call from a phone 142 via the network 140 and/or a second call from a phone 152 via the network 150 and/or a third call from a phone 162 via the network 160.

The mobile device 102 can include an interface 101 for facilitating generation, receipt, processing, and management of the call control data 112/113 for delivery over the narrowband call control channel 111 and/or the broadband call control channel 110. The interface 101 can be configured to implement various functionalities, including receiving inbound calls, dialing outbound calls, and click to call generating a combined inbound and outbound call.

In some implementations, the TSP system 130 can include a service manager 134, and a database ("DB") 136. The TSP system 130 can provide for bridging calls generated by disparate telecommunications technologies associated with communications devices 142 and 152 and 162. For example, as an alternative to answering an inbound call on the mobile device 102, the call can be recorded (such as voice mail) on the mobile device 102 and/or on the TSP system 130 and simultaneously reviewed on the mobile device 102 via the user interface 101. During call recording, the inbound call can be answered dynamically at the mobile device 102 and/or transferred to one or more of communications devices 142, 152, and 162. Completed recordings (e.g., announcements, voice mail, etc.) can be reviewed at the mobile device 102 via user interface 101.

The service manager 134 can be configured to interact with a remote computing device 120 or with the mobile device 102 to receive configuration parameter data ("conf param") 122. Further, the service manager 134 can be configured to store configuration parameter data 122, and responsive to such data, the TSP system 130 can be implemented by a user to control inbound calls before, during, or after reaching the mobile device 102. Further, the service manager 134 can be configured to store in the database 136 audio or video files recorded via the user interface 101 on the mobile device 102 and transmitted to the TSP system 130 via the narrowband call control channel 111 and/or the broadband call control channel 110.

Telecommunication Service Provider System Overview

Figure 2:
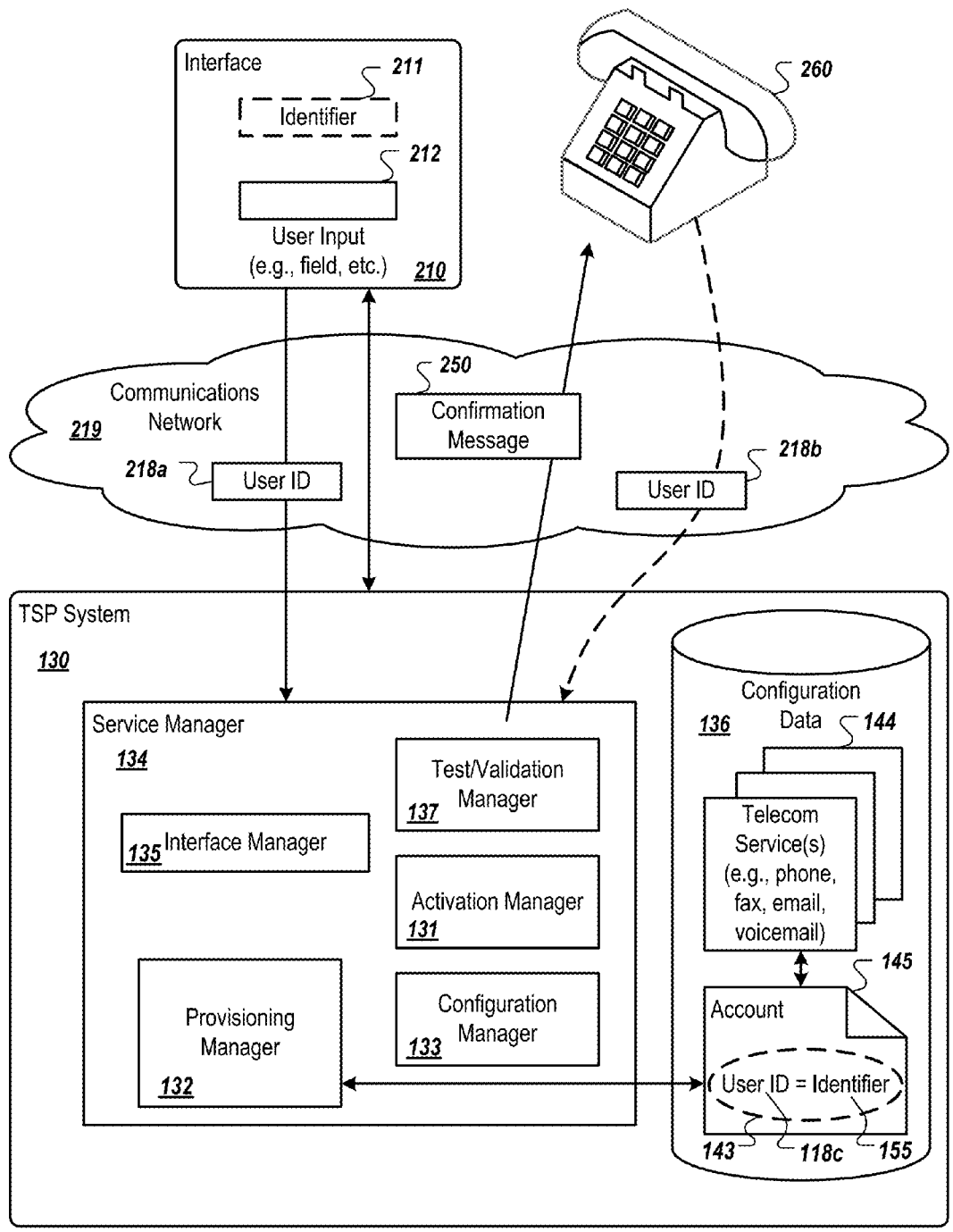
FIG. 2 illustrates an example of components associated with a telecommunications service provider system.

FIG. 2 illustrates an example of components associated with the TSP system 130. Referring to FIG. 2, the service manager 134 of the TSP system 130 can be configured to receive data representing a request to activate a subset of virtual PBX services. The data can include user identification information, such as user ID 218*a* or user ID 218*b*, either of which can be sufficient to activate the virtual PBX services. The TSP system 130 can be configured to receive user IDs 218*a* and 218*b*, such as from a communications network 119 from an interface 210 on a mobile device.

The user IDs 218*a* and 218*b* can represent a telephone number for a phone 260 or a mobile device transmitting an activation request to activate the virtual PBX services on the mobile device. In some implementations, the mobile device can be reachable via an identifier 155, and the identifier 155 can be used as an extension for which the virtual PBX services can be rendered. The user IDs 218*a* and 218*b* can represent the same user identification number, but indicate that the user identification number may have been obtained by different techniques (e.g., by way of interface 210 or by way of call data).

An identifier (e.g., identifier 155) can be a telephone number (e.g., a toll-free telephone number, such as a main telephone line) for accessing virtual PBX services. An identifier can also be an email address, or any other symbol (or set of symbols) that represents a common contact identifier for a group of contact identifiers, such as a group of extension numbers for a PBX. Prior to activation, an identifier can be associated with a subset of virtual PBX services of TSP system 130 that are yet to be provisioned and activated. A "user identifier" (e.g., user ID 118*c*) can refer to a contact identifier (such as the phone number of the phone 160 or mobile device) that can be associated with an extension number in a group of extension numbers. A "user identifier" can also be a facsimile number for a fax machine, an email address of an email account, or a voice mail address, to name a few examples.

A mobile device can communicate with the TSP system 130 and submit information input by the user using the interface 210. As discussed above, the user ID 218*a* can be contact information, name, telephone number, email address, or a main telephone number selected by the user trying to activate the account. The database 136 can be configured to store data representing configuration data 144 for configuring the virtual PBX services. In some implementations, configuration data 144 can be pre-configured to provide a discrete set of virtual PBX services that, for example, can be activated by the service manager 134 using user IDs 218*a* and 218*b*, without requiring other information. Configuration data 144 can include the identifier 155 for accessing the virtual PBX services, where the identifier 155 can be associated with other configuration data 144 either prior to, or after, the TSP system 130 receives the data representing the request to activate or access the virtual PBX services.

In some implementations, the TSP system 130 can be configured to generate signals for transmission to the phone 160 to confirm successful activation of the telecommunications services. In some implementations, the signals can be of the form of a confirmation message that is sent to the mobile device initiating the activation request. For example, the confirmation message 250 can include signals that cause the phone 260 to ring, among other things, thereby confirming that a call to the identifier 155 can be routed to a communications device associated with user IDs 218*a* or 218*b*. As described above, the identifier 155 can specify a main telephone number (or main number) for accessing a set or subset of virtual PBX services.

In some implementations, configuration data and related parameters for configuring the virtual PBX services can be accessed via an internet browser. For example, the user can access the configuration data and related parameters by logging onto account 145 using the identifier 155. The user can be authenticated to confirm authorization before the configuration and related parameters can be viewed and modified. Once authenticated, the user can be presented with a call handling interface through which configuration data associated with the virtual PBX services can be accessed. In some implementations, the configuration data can include parameters pertaining to call handling rules for handling incoming calls based on the call handling rules. For example, when an outside caller calls the virtual PBX main number for a small business, and chooses an extension, the extension user associated with that extension can be reached on a predefined mobile device, home telephone, office phone or other phone type according to the call handling rules. In some implementations, the user can activate, deactivate, add, remove or modify one or more call handling rules or configuration parameters associated with the virtual PBX services In some implementations, the TSP system 130 can generate an interface 210 to be displayed on the phone 160 (where the phone 160 has a display for displaying information). The interface 210 can be configured to receive user input, which can be a field 212 configured to accept data, such as user identification information (e.g., such as a user identifier, which can be represented as user ID 218a). Optionally, the TSP system 130 can generate a representation 211 of an identifier to present in the interface 210. The representation 211 can be a toll-free number as a main telephone line associated with the virtual PBX services. The interface 210 can be accessible as a web page at a particular URL.

In some implementations, where the phone 160 is a mobile device, the interface 210 can be generated by an application on the mobile device. The mobile device can receive the information such as the main identification number from the TSP system 130 (or the server), and present the main identification number in the interface 210 presented by the virtual PBX services application running on the mobile device. In some implementations, the TSP system 130 or the virtual PBX services application running on the mobile device can present field 212 simultaneously (or substantially simultaneously) to the presentation of representation 211 of the identifier. In some implementations, the TSP system 130 can configure configuration data 144 (or a portion thereof) prior to presenting either field 212 or representation 211 of an identifier or both. As such, little or a negligible amount of information can be sufficient to provision a subset of virtual PBX services, which can be defined by the pre-configured portions of the configuration data 144. In some implementations, the subset of virtual PBX services can operate as a default set of services, thereby reducing or eliminating the need for the user to perform an initial and/or a complicated configuration of telecommunications services. Further, the TSP system 130 or the virtual PBX services application running on the mobile device can maintain the presentation of interface 210 during the activation of the subset of virtual PBX services, without transitioning to other interfaces. In view of the foregoing, a discrete set of virtual PBX services can be provisioned and activated without transitioning away from the interface 210. In some implementations, this can simplify the procurement of virtual PBX services.

In some implementations, the TSP system 130 can test and validate successful activation of the subset of virtual PBX services, and can confirm the validation by, for example, generating a call including a confirmation message 250 to the phone 160 or the mobile device from which the activation request was sent. If a user identifier is entered into the interface 210, then TSP system 130 can generate a call to the user identifier number to confirm activation of the subset of virtual PBX services. In some instances, the call can include the confirmation message 250 to the user identification number or the mobile device sending the activation request, substantially simultaneously to the presentation of either field 212 or representation 211 of the identifier in the interface 210. In some implementations, the confirmation message 250 can also include an automated-voice notification that the activation has been complete. Alternatively, the confirmation can be sent to other contact endpoints provided by the mobile device, such as an email address, a fax number, or SMS address, or to the virtual PBX services application running on the mobile device. In some implementations, once the virtual PBX services application receives a confirmation from the server that the service is activated successfully, the application can present a summary page or confirmation to the user in an interface on the mobile device.

In the example shown, the services manager 130 can include one or more of the following: a provisioning manager 132, an activation manager 131, and a test/validation manager 137. Provisioning manager 132 can operate to configure configuration data 144 to provide a subset of virtual PBX services in association with, for example, the user account 145. While the user account 145 can include data representing user identification information (e.g., user IDs 218a and 218b), the user account 145 can also include data representing identifier 155, and/or data representing an association between the user identification information and data representing identifier 155. In some implementations, the provisioning manager 132 can operate to configure configuration data 144 prior to receiving a request to provision a set of default services. In some implementations, the provisioning manager 132 can operate to configure configuration data 144 after receiving the request.

To provision telecommunications services once a request has been made, the provisioning manager 132 can determine either the user ID 118c or the identifier 155, or both, and form an association 143 with which to activate (or subsequent access) the virtual PBX services. In some instances, the provisioning manager 132 can determine both the user ID 118c and the identifier 155, and configure the user account 145 to include both parameters. For example, the user ID 118c can be received as the user ID 218a via the interface 210. In some implementations, the identifier 155 can be selected when the user selects representation 211 of an identifier from a pool of identifiers. The provisioning manager 132 can determine the selected identifier and store the selected identifier in the user account 145, and can remove the selected identifier from the pool of available identifiers so that the selected identifier can no longer be provisioned. In some implementations, the identifier 155 can be generated without feedback from the user (e.g., as a pre-determined identifier that can be pre-selected or randomly determined), with the provisioning manager 132 storing the pre-determined identifier in the user account 145 as the identifier 255. In this case, either the ID 218a or the ID 218b can be sufficient for provisioning, configuring, and activating telecommunications services such that the user need not enter a selection for an identifier or other information.

The activation manager 131 can be configured to activate the user account 145 once the user account 145 has been provisioned with configuration data defining a subset of virtual PBX services. The identifier 155 can be used to access the activated subset of virtual PBX services. For example, where the identifier 155 is a telephone number, then the telephone number can be a main line that can provide access to the virtual PBX services. For example, where the identifier 155 is a telephone number, then the telephone number can be a main line that can provide access to the telecommunications services defined by, for example, the user account 145. In some implementations, the test/ validation manager 137 can optionally be used to validate successful provisioning and activation of the subset of virtual PBX services. For example, to validate a telephone number provided as user ID 218a, the test/validation manager 137 can be configured to make a call to the telephone number associated with phone 160. As another example, the user ID 218a can be an email address where the test/validation manager 137 can be used to send an email message to the email address to validate that the email address can be implemented as an extension.

In some implementations, a single submission of data (e.g., user ID 218a) to the TSP system 130 can enable the user to acquire an account to use the virtual PBX services. In some implementations, the user need not provide other data (e.g., contracting, billing, configuration, or other information) to activate the subset of virtual PBX services. Once the user account 145 is activated, the telecommunications services can be used. That is, the user can start using the primary identification number (e.g., a toll-free telephone number) associated with the virtual PBX services as a common contact identifier 155 (or address) nearly instantaneously, so that third parties can immediately access the associated virtual PBX services (e.g., the user's customers can contact the user at an extension linked to the identifier 155). For example, if the virtual PBX services include a call-forwarding service, a call made to a specified toll-free telephone number (e.g., the identifier 155) can be forwarded to a telephone number, such as user ID 218a.

Examples of the interface 210 can include physical interfaces (e.g., a display on a mobile device) and virtual interfaces (e.g., a web page, panel, window, display, palette, tab, screen, or the like in an application program running on the mobile device). In some implementations, the user can provide additional data in a single submission to request activation of telecommunications services. Further, the TSP system 130 can include one or more servers, software applications, application programmable interfaces (APIs), logic (e.g., software or electrical/hardware logic), or any combination thereof. For example, in addition to the provisioning manager 132, an activation manager 131, a test/validation manager 137, the service manager 134 can include other components, such as, for example, a configuration manager (not shown), any of which can be implemented in hardware, software, or any combination thereof.

In some implementations, the telecommunications services can be associated with configuration data that represents any combination of virtual PBX services, such as services selected from the group of call forwarding, call routing, facsimile, email, text messaging, voice messaging (e.g., voice mail), extension support, private branch exchange, call handling, multiple greeting prompts, call screening rules, ring-out rules, international calling, caller ID rules, after hours rules, announcement prompts, and other services. A default configuration for the virtual PBX services can be stored in the database 140 as, for example, the configuration data 144.

In some implementations, the term "single submission," such as single submission of data, can refer to sending, providing, or transmitting sufficient data to activate or request telecommunications services from an interface without requiring an interface transition to provide additional data to request the same telecommunications services. An example single submission of data can be clicking a button on a graphical user interface (e.g., "submit", "send", or "activate" buttons, or the like) on a mobile device.

In some implementations, "provisioning" can refer to providing capabilities for telecommunications services (e.g., virtual PBX services) to the user or customer account, including transmission of voice, data, or both to a telephone number, facsimile number, email address, voicemail address, the like, or any combination thereof. This can include providing for the hardware, software, storage, processing power, administrative requirements and the like necessary for supporting the services for a given account. The account can be a placeholder account not currently activated or associated with a particular user.

In some implementations, "configuring" can refer to modifying data for a user account to configure one or more virtual PBX services. In some implementations, the term "activating," can refer to enabling a user account and its data (e.g., configuration data) to provide virtual PBX services. In some implementations, the foregoing system, components, elements, and processes can be varied in number, structure, function, configuration, implementation, or other aspects and are not limited to those shown and described.

To illustrate the operation of TSP system 130, the following example is provided. However, it should be understood that the example is non-limiting and that the virtual PBX service provider system 100 can be applied in various applications. Initially, a request for activation can be handled by the provisioning manager 132, for example, by creating and storing the user account 145 in the database 140. The user account 145 can include a binding of a cellular telephone network (CTN) (e.g., 1-650-555-9876) to a timeslot interchange device (e.g., 1-888-555-1200), which in turn can be associated by the association 143 with virtual PBX services that can be defined by the configuration data 144. The configuration data 144 can be used to configure the virtual PBX services including different types of services (e.g., call extensions, facsimile, email, voicemail, and the like), and number of services in each type (e.g., four call extensions, an email box, and a facsimile), any combination of services types, and/or one or more rules to, for example, govern how services are rendered (e.g., for extension 1, if a call is not answered by the third ring, send the caller to a voicemail box). The configuration manager 133 can be used to create the configuration data 144. In some implementations, the configuration data 144 can be pre-defined (e.g., defined before a user initiates an activation request). The configuration manager 133 can also be used or add, remove, or modify the virtual PBX services after the virtual PBX services have been initially activated. Additional databases can be used to store automatic number identification (ANI) data, calling name (CNAM) data, dialed number identification service (DNIS) data, or any other data or combination thereof. These additional databases can be accessed by the provisioning manager 132, the configuration manager 133, the activation manager 131, or other system components to access or look up additional data associated with a CTN. For example, the name of a caller can be looked up using a telephone number (e.g., a CTN). Other call data (e.g., caller ID or ANI data) can be determined using a telephone number (e.g., a CTN).

In some implementations, after a placeholder account is provisioned and configured (e.g., configured in accordance with default configuration data), the placeholder account and the virtual PBX services associated with the placeholder account can be activated. To activate the placeholder account, the activation manager 131 can, for example, mark an "activated" flag or field in the placeholder account, or in the configuration data 144 thereof, to indicate that the placeholder account and its services have been associated with a user and have been activated. In some implementations, activating an account (e.g., associating a placeholder account with a user ID) can be done in real-time or instantaneously, at least as perceived by the user. By pre-provisioning one or more placeholder accounts before the user requests for activation are received, the TSP system 130 can have a set of pre-provisioned accounts available. When the user request is received, the association between a pre-provisioned account and the user can be accomplished without hardware and/or personnel delays. The association between the placeholder account and a user ID can be fully automated, and can be accomplished within seconds as opposed to days or weeks as required by conventional provisioning and activation techniques. In some implementations, physical resources necessary for account setup and configuration can be pre-provisioned, and an account can be configured and activated by associating the different resources with a user ID. Because the major bottlenecks in account setup in conventional techniques have been eliminated before a user request is received, the account activation can be effectively instantaneous to the user making the request.

In some implementations, the test/validation manager 137 can be used to test or validate a CTN or to confirm activation. For example, to test activation, the test/validation manager 137 can interact with a communications interface (e.g., a call handler) to call a timeslot interchange (TSI) associated with the CTN, which, in turn can cause the TSP system 130 to generate a call to the CTN after a successful activation. The communication interface can detect whether the TSI is associated with virtual PBX services provided by the TSP system 130. If so, the TSP system 130 can look up the associated CTN in the database 140, retrieve information relevant to the user account 145, and route the call to the CTN, which is received at the phone 160 or a mobile device sending the activation request. Caller data, such as caller-ID data, or the TSI can be sent to the telephone 160 or the mobile device sending the activation request. Alternative designs for the telecommunications service provider system are also possible.

The TSP system 130 can include any number and any combination of the following: web server, databases, media server, call handler, and service manager server. In some implementations, the TSP system 130 can include an additional server for handling requests from a virtual PBX services application running on a mobile device. This additional server can be implemented as part of the web server, or a standalone server.

Example Device Implementation

Figure 3:
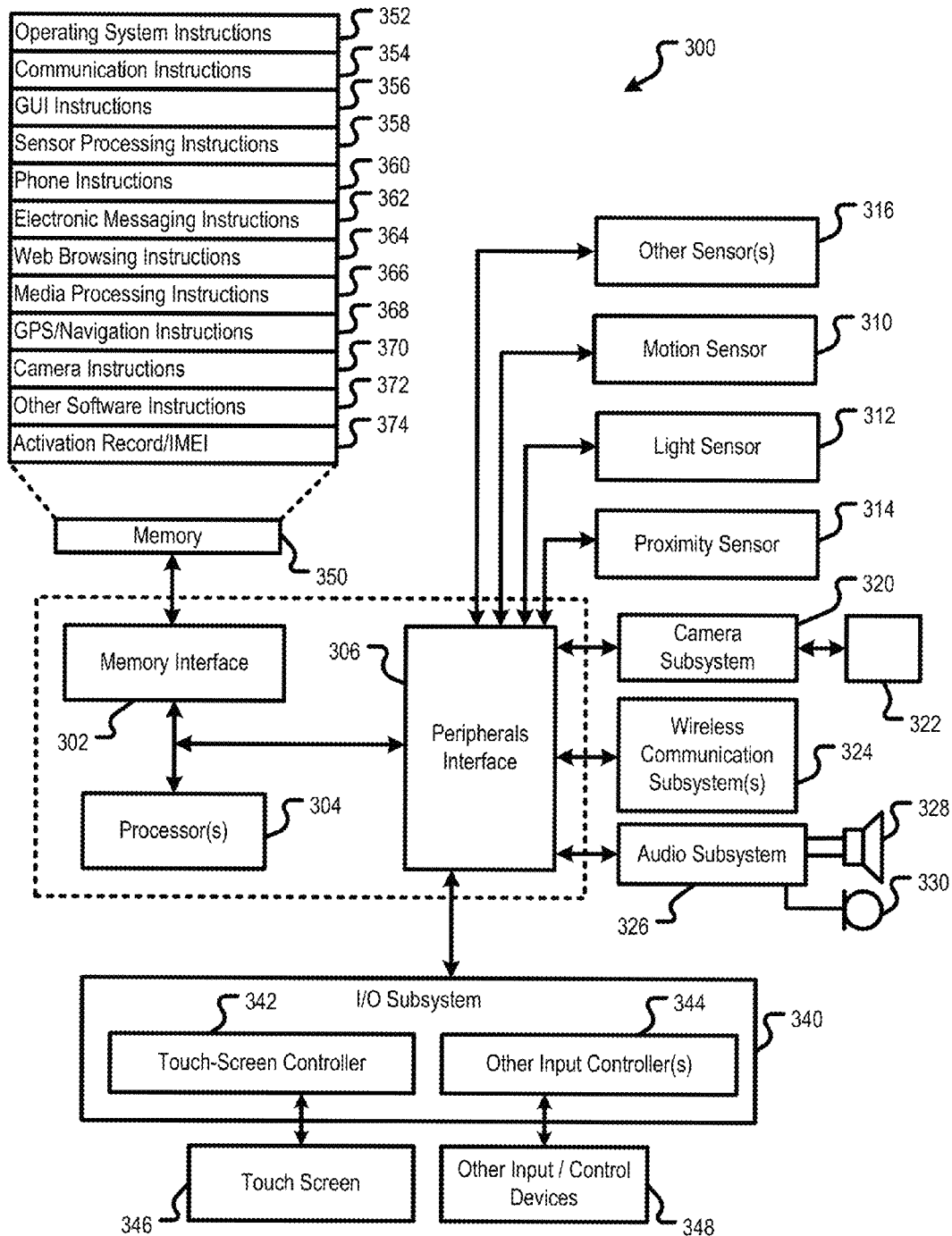
FIG. 3 is a block diagram of an example of architecture of a communications device.

FIG. 3 is a block diagram of an example architecture 300 of a communications device. In some implementations, the communication device can be a mobile device, or any communications device used in the telecommunication network 100.

Referring to FIG. 3, the communications device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the communications device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the communications device is intended to operate. For example, a communications device can include communication subsystems 324 designed to operate over a GSM network, a GPRS network, an EDGE network, a Wi-Fi or WiMax network, and a Bluetooth™ network. In particular, the wireless communication subsystem 324 can include hosting protocols such that the communications device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, the pressing of a button for a first duration can disengage a lock of the touch screen 346; and the pressing of the same or different button for a second duration that is longer than the first duration can turn power to the communications device on or off. The user can customize a functionality of one or more of the buttons. The touch screen 346 can, for example, also be used to implement virtual or soft buttons and/or a keyboard.

In some implementations, the communications device can present recorded audio and/or video files, such as MP3, AAC, and MPEG files. In some implementations, the communications device can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the communications device can be implemented in hardware and/or in software, including in one or more signal processing and/or application specific integrated circuits.

Provisioning Interfaces for Mobile Applications

Activation, configuration, use, and management of a virtual PBX entirely on a mobile device solves many problems of conventional PBX services. A virtual PBX user is not limited by location and equipment, and can set up, configure, and modify the virtual PBX on the go. In some instances, a small business can instantly activate and provision a business grade multi-extension virtual PBX from a mobile device. Each extension user can also configure and modify the call handling rules for his/her particular extension. When an outside caller calls the virtual PBX main number for the small business, and chooses an extension, the extension user associated with that extension can be reached on the user's own mobile device, home telephone, or office phone according to pre-defined call handling rules. Mobile devices with various network capabilities and graphical user interfaces allow various virtual PBX functions to be performed over multiple networks to save cost while maintaining uninterrupted connectivity and finest call quality.

In some implementations, the account holder (which can be the administrator or the main user) can be presented with one or more user interfaces for setting up and activating a mobile user account where the user can set up and configure one or more virtual PBX services including, without limitation, a main number, call forwarding, voicemail, and auto-receptionist service. In some implementations, the user can set up one or more virtual PBX services tailored for a specific kind of business including call routing, multiple extensions, and after-hour service after providing a minimum set of information through a small number of interface screens in one sitting. In some implementations, the user can configure and modify multiple extensions and virtual PBX services associated with each extension using a mobile device.

To facilitate discussion, examples are set forth in the context of a mobile device having a touch sensitive screen for receiving user input, such as an iPhone® made by Apple, Inc®. However, one skilled in the art would recognize that the same principles can also be applied to other types of mobile devices. Accordingly, examples described below should not be construed to limit the claims in these respects.

Also, example interfaces shown in FIGS. 4-10 can display one or more user interface elements that are user-selectable. Each user interface element can be associated with an application that can be invoked by a user input selecting the corresponding user interface element with an input device. Each application can enable the user to interact with one or more call and no-call based services and functions, as will be discussed in greater detail below.

In some implementations, example interfaces shown in FIGS. 4-10 can be presented to the user as an application available on the mobile device. For example, the application can be represented as an icon that can be selectable by the user of the mobile device. The icon representing the application can be invoked by a user input selecting it with a pointing device or touching it on the touch sensitive screen of the mobile device. In some implementations, the application can be configured to run as a default program and can be activated whenever the mobile device is first turned on. In some implementations, one or more functions of the application can be implemented as separate modules that each has its respective icon and can be invoked separately. For example, the activation and configuration functions can be implemented as a separate module from the telephone/voicemail module. Once the applicable application icon is invoked, a settings interface (e.g., settings interface shown in FIG. 9) can be presented offering the user options to use or configure an existing virtual PBX service account (or to activate and configure a new virtual PBX service account by adding one or more new users or departments).

In some implementations, example interfaces shown in FIGS. 4-10 can be accessed only after the user has set up a virtual PBX service account and activated the virtual PBX services associated with the account (e.g., by providing configuration parameters for configuring the virtual PBX services). The user can associate, for example, the mobile number to identify the user to the outside callers and at the TSP server end. The virtual PBX services activated can include a subset of pre-provisioned and pre-configured virtual PBX services, optionally customized based on information provided during the activation by the user. For example, a pre-provisioned service can include call forwarding to the contact number provided by the user or to multiple numbers according to call forwarding rules set by the user during activation. After setup and authentication, the user interfaces can be used to add, delete or modify new or existing call forwarding rules.

Where a virtual PBX service account has not previously been established, the user can invoke the application available on the mobile device (e.g., by clicking on the application icon), and a login interface can be presented to the user that can also be used as a setup interface through which a new virtual PBX service account can be created.

Figures 4A, 4B, 4C:
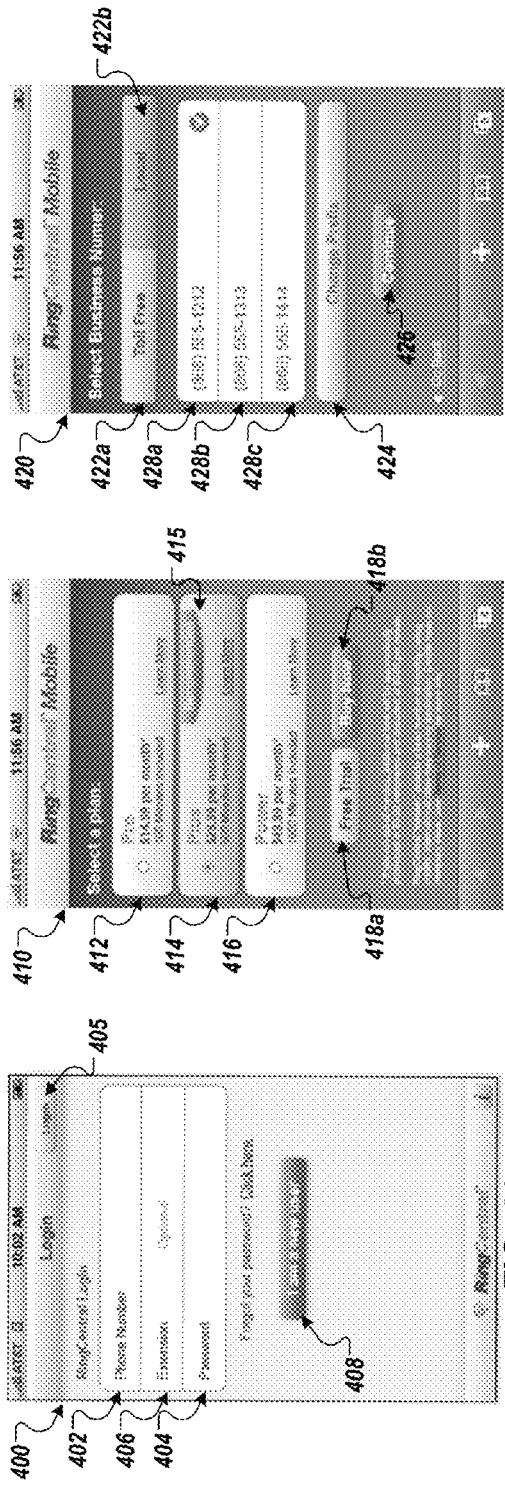
FIG. 4A shows an example of a login interface.
FIG. 4B shows an example of a service plan interface.
FIG. 4C shows an example of a number selection interface.

FIG. 4A shows an example of a login interface 400. As shown in FIG. 4A, the login interface 400 can allow the user to choose whether to log into an existing virtual PBX service account, to setup an extension, or to activate a new virtual PBX service account. To log into an existing account, the user can enter an identifier (e.g., identifier 155, a phone number registered with the service manager 134, or a user identification number), and corresponding authentication password in the appropriate fields (402 and 404) on the login interface 400. Optionally, the user can enter an extension number (e.g., via field 406) for setting up an extension that has been provided, for example, in a separate session associated with a main virtual PBX number. After completing the identifier and password information in the fields 402 and 404, the user can proceed to log into the virtual PBX service account by clicking on the login button 405 on the login interface 400. In some implementations, the user can set up the application to remember the identifier and password, and automatically populate the requisite fields every time the user invokes the application.

In some implementations, the option to create a new virtual PBX service account can be presented in a form of a new user button (or link) 408 that invokes a different user interface where the user can enter requisite information to create and activate a new virtual PBX service account.

In some implementations, where a free or evaluation account option is offered, upon selecting the new user link 408, a new user interface can be presented that displays three fields of information: (1) an identifier field where the user can choose one of a group of primary identification numbers (or a main telephone number for the virtual PBX service account, such as a toll-free number provided by the telecommunications service provider out of a set of available numbers); (2) an authentication field where the user can enter a user identifier, and (3) a forwarding number field where the user can enter one or more phone numbers to forward to when a caller calls the primary identification number. In some implementations, the authentication field can be the same as the forwarding number field.

FIG. 4B shows an example of a service plan interface 410 through which the user can select one or more service plans each associated with a different set of virtual PBX services. Referring to FIG. 4B, the user can select, for example, one of three service plans displayed by the service plan interface 410. For example, the service plan interface 410 can present a first service plan 412 that includes one hundred minutes of calling (e.g., to or from any called party), a second service plan 414 that includes five hundred minutes of calling, and a third service plan 416 that includes one thousand minutes of calling. In some implementations, an indicator 415 can be displayed that recommends a particular service plan. The user can also be presented with two options; (1) a free trial option through which the user can try a particular service plan for a particular period without being charged for the use of the service plan (e.g., by selecting the free trial button 418*a*), and (2) a buy-now option (e.g., by selecting the buy-now button 418*b*) to immediately purchase a selected service plan.

In some implementations, where the user has selected the free trial option 418*a*, a predetermined set of virtual PBX services can be activated for the free trial account for a limited period of time (e.g., twenty-four hours) for evaluation purposes. To maintain the activated services beyond the limited period, the user can, for example, submit additional data, such as billing information, to proceed with purchasing the selected service plan.

Figure 4D:
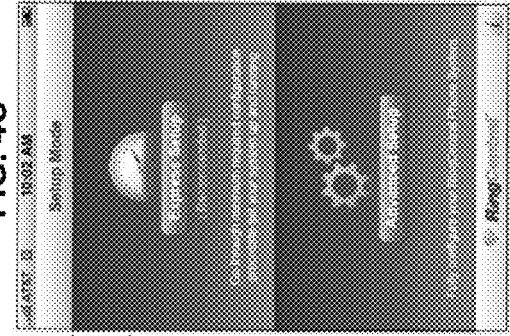
FIG. 4D shows an example of a prefix interface.

Once a particular service plan has been selected from the service plan interface 410, the user can be directed to a number selection interface to select a business number to be associated with a selected service plan. FIG. 4C shows an example of a number selection interface 420 that can be presented to the user after selecting one of the free trial option or the buy-now option. As shown in FIG. 4C, the user can select among toll free numbers (e.g., by clicking on or selecting the toll-free button 422*a*) or local numbers (e.g., by clicking on or selecting the local button 422*b*). For example, when the user clicks on the toll-free button 422, three toll-free numbers 428*a*, 428*b* and 428*c* can be presented to the user. Optionally, the user can be given the option to change the prefix of a particular business toll-free number. FIG. 4D shows an example of a prefix interface 430 that can be invoked when the user selects the change prefix button 424 to initiate the change process to change the prefix of a particular number. The prefix interface 430, as shown in FIG. 4D, can display one or more available prefixes 436*a*, 436*b* and 436*c*. The prefix currently selected can be indicated by an indicator 432. The user can select from other prefixes to replace the selected prefix. For example, the user can select prefix "877" to replace the currently selected prefix "866". The business numbers can also be listed using the selected prefix by selecting the "List Numbers" button 434.

Figure 4E:
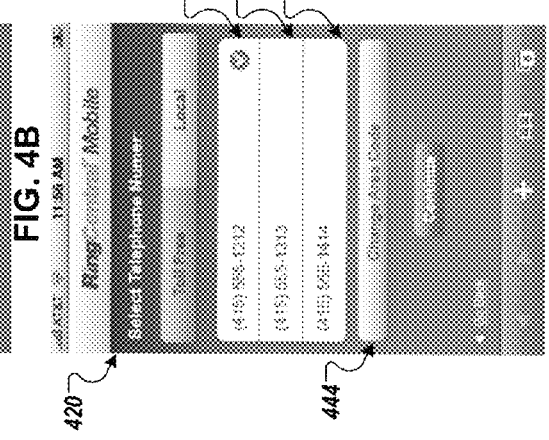
FIG. 4E shows an example of a number selection interface.

Referring back to FIG. 4C, the user can also select a local number instead of a business number by clicking on the local button 422*b*. Once selected, the number selection interface 420 can display one or more local numbers to the user (e.g., local to the geographic location of the user), as shown in FIG. 4E. Similar to changing prefixes for business numbers, the area code of the local numbers can also be changed if so desired by the user. For example, the user can be presented with one or more area codes available for a particular local number 442*a*, 442*b* or 442*c* by selecting the "Change Area Code" button 444.

Figure 4F:
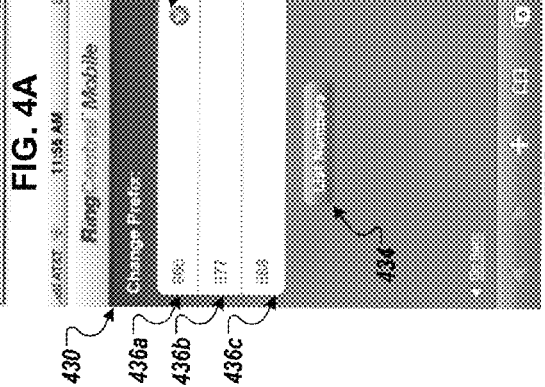
FIG. 4F shows an example of a setup mode interface.

Once a number has been selected (e.g., a business or local number), the user can continue with the setup process by clicking on the "Continue" button 426. Once the "Continue" button 426 is selected, a setup mode interface can be displayed to the user showing two options that the user can select to complete the setup process. FIG. 4F shows an example of a setup mode interface 450. As shown, the setup mode interface 450 can display an express setup option 452 and an advanced setup option 454. The express setup option 452 allows the user to proceed with minimum required configuration to setup a virtual PBX service account, while the advanced setup option 454 allows the user to submit additional information for configuring the virtual PBX service account.

In some implementations, once the new virtual PBX service account has been set up, a single submission of data (e.g., user ID 218*a*) to the TSP system 130 can enable the user to access one or more virtual PBX services associated with the new virtual PBX service account so that there is no further need for the user to provide other data (e.g., contracting, billing, configuration, or other information) to activate the virtual PBX services. Once the new virtual PBX service account is activated (e.g., whether the user has selected the free trial option or immediate purchase option), the virtual PBX services can be immediately accessed and configured if so desired. The user can start using the primary identification number (e.g., a toll-free business number or a local number) associated with the virtual PBX services as a common contact identifier (or address) nearly instantaneously, so that third parties can immediately access the associated virtual PBX services (e.g., the user's customers can contact the user at an extension reachable via the identifier). For example, if the virtual PBX services include a call-forwarding service, a call made to a toll-free telephone number activated by the user can be forwarded to a telephone number previously designated by the user during the set up process (e.g., the number associated with the user ID 218a or 218b).

In addition to setting up and activating a single-line virtual PBX service account on the user's mobile device, in some implementations, the user can also set up a multi-extension account for virtual PBX services through the mobile device. FIGS. 5A-5D show an example process for setting up and activating a multi-extension virtual PBX service account on a mobile device.

Figure 5A:
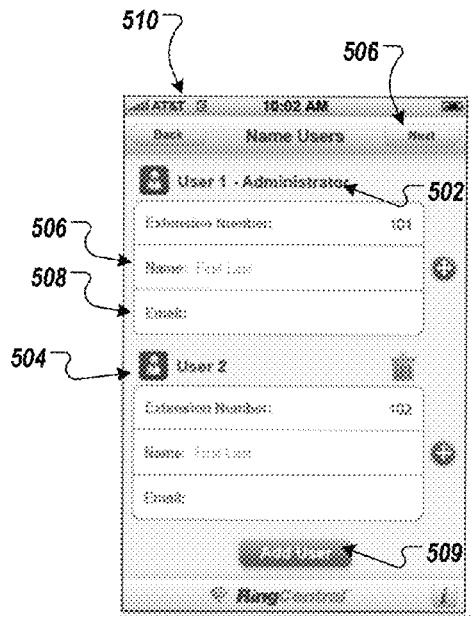
FIG. 5A shows an example of a username interface.

In some implementations, the multi-extension virtual PBX service account can be displayed using a username interface. FIG. 5A shows an example of a username interface 510. In some implementations, the username interface 510 can be presented to the user upon selecting one of the express setup option 452 and the advanced setup option 454 shown in FIG. 4F. As shown in FIG. 5A, the username interface 510 allows the user to input or add one or more extension numbers to be associated with a toll-free or local number selected previously (e.g., one of toll-free numbers 428a-428c or local numbers 442a-442c). In some implementations, the first user displayed by the username interface 510 can be the name of the user holding configuration privilege to the account. For example, the user holding the configuration privilege can be the administrator 502 of the account. A default extension number (e.g., extension "101") can be given to the administrator 502. Optionally, the user can enter additional information associated with the administrator 502 such as the name (e.g., via name field 506) or email address (e.g., via email address field 508) of the administrator 502. If desired, the user can also add additional extension users to the account by selecting the "Add User" button 509.

Figure 5B:
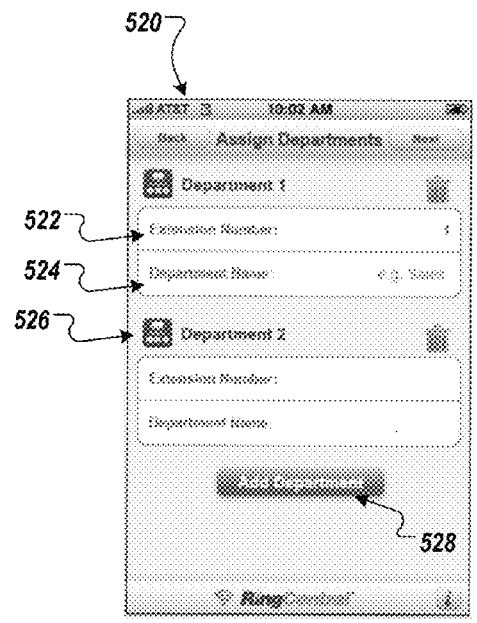
FIG. 5B shows an example of a department assignment interface.

The user can also add or assign one or more extensions to one or more departments using a department assignment interface (e.g., by pressing the "Next" button 506). FIG. 5B shows an example of a department assignment interface 520. Referring to FIG. 5B, one or more departments can be created, and one or more extensions can be assigned to the one or more departments. In the example shown, the department extension 522 can be assigned to a "Sales" department as defined in the department name field 524. A second department 526 and associated extension information can also be added and displayed below the first department. Similar to the function provided by the "Add User" button 509, an "Add Department" button 528 can also be included in the department assignment interface 520 that allows additional departments to be added.

Figure 5C:
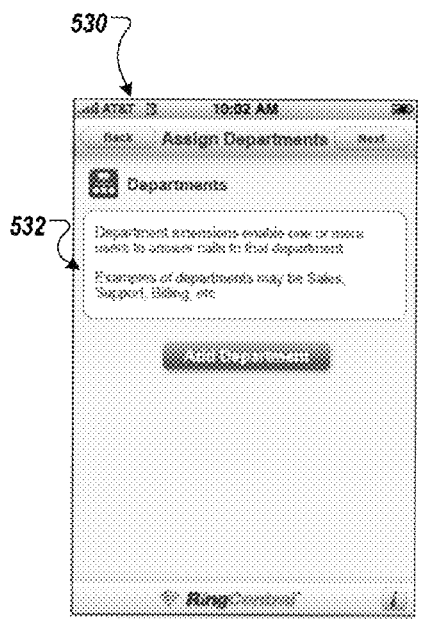
FIG. 5C shows an example of the department assignment interface shown in FIG. 5B displaying a message.

In some implementations, prior to displaying the appropriate fields for defining the departments or department extensions, a department introductory message can be displayed to the user. In some implementations, the department introductory message 532 can communicate with the user that the user can proceed with adding one or more department or department extensions to be associated with the selected phone number if so desired. As an example, as shown in FIG. 5C, the department assignment interface 520 can display the message "Department extensions enable one or more users to answers calls to that department. Examples of departments may be Sales, Support, Billing, etc." Other messages can also be included to guide the user in adding one or more departments or department extensions, or completing the user/department configuration process.

In some implementations, multiple concurrent sessions can be executed concurrently. For example, multiple extension users (if defined) can access and configure the individual extension profile concurrently. Any changes made to the individual extension profile can be reflected immediately (e.g., in real time) in the call management system 100 that allows real-time update to the extension user profiles across the system.

As discussed above, the user can choose to add one or more extension users (or departments) to create a multi-extension environment. In setting up the multi-extension environment to supplement the virtual PBX services, multiple extension users can share a same main number, and an outside caller can choose which branch or extension to call by identifying the branch, extension name or extension number. Users of each extension can have an individualized set of pre-provisioned and pre-configured virtual PBX services, optionally customized by themselves or by the user activating the service account (e.g., the administrator or account holder).

Figure 5D:
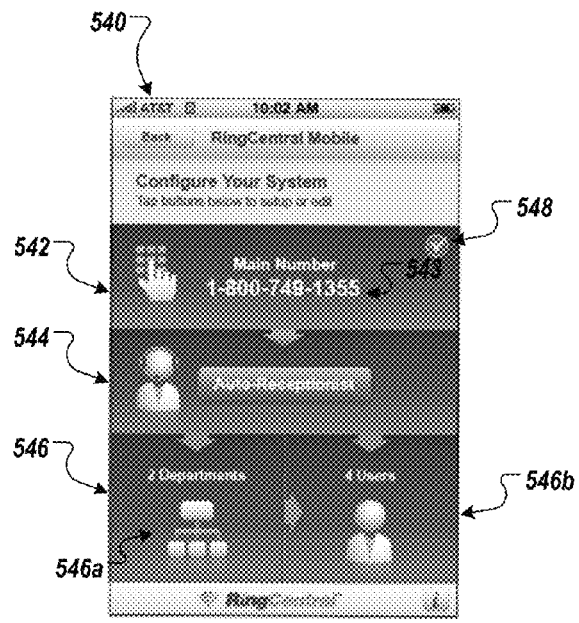
FIG. 5D shows an example of a configuration interface.

Once the preliminary user information has been entered, a configuration interface can be presented to the user showing the current configuration associated with the account. FIG. 5D shows an example of a configuration interface 540. Referring to FIG. 5D, the configuration interface 540 can include a main number interface element 542, an auto-receptionist interface element 544, and an entity interface element 546. Each user interface element 542-546 can be associated with an application that can be invoked by a user input selecting the corresponding user interface element 542-546. Each application can enable the user, administrator or account holder to interact with one or more mobile-based virtual PBX services or functions, as will be discussed in greater detail below.

The main number interface element 542 can indicate an identifier 543 entered during login (e.g., identifier 155). If desired, the main number interface element 542 can also display a fax number or an email address. The email address can be linked to the identifier 543 that is subscribed to, for example, voice to email services, facsimile to email services, or other services using that email address.

The auto-receptionist interface element 544, when activated, can auto-manage all of the virtual PBX services on behalf of the user (or in addition to other extension users). For example, when activated, the auto-receptionist can play a computer-generated greeting to callers of all incoming calls to the user at the mobile device. The user can also select one of the personal greetings stored in a database (e.g., database 136), and configure the auto-receptionist to play the selected personal greeting instead of the computer-generated greeting.

The user or administrator can also configure the auto-receptionist to associate the personal greeting that can be played upon receiving a caller selection of an extension with that extension. For example, a caller may verbally request the auto-receptionist to connect to extension user "Jane Doe". In response to the verbal request, the auto-receptionist can play the personal greeting previously recorded for extension user "Jane Doe". As another example, a caller may input extension "105" upon reaching the main number. In response, the auto-receptionist can identify extension "105"

as being associated with extension user "Jane Doe", and play the personal greeting for extension user "Jane Doe" to the caller.

In some implementations, the auto-receptionist can be configured to handle incoming calls and provide call assistance to incoming calls during and/or after business hours. For example, the auto-receptionist can be programmed to be activated to answer all calls received after hours and play a selected company greeting to the callers (e.g., playing a default company greeting announcing the company is closed). As another example, the auto-receptionist can be configured to provide callers with the company directory through which the callers can be transferred to the desired extension user(s) for all calls received after hours. If desired, the auto-receptionist can also be configured to forward all incoming calls received after business hours to a preselected extension user (e.g., an operator as selected by the user), where the selected user can receive all calls and messages. For example, the auto-receptionist can be configured by the user to select extension user "John Smith" at extension "101" to take all incoming calls received during or after business hours.

In some implementations, the auto-receptionist can be programmed with one set of rules for calls received during business hours and a different set of rules for calls received after business hours. As an example, the auto-receptionist can be configured to request each caller to input the extension number (or extension user) that the caller is trying to reach for calls received during business hours. When calls are received after business hours, the auto-receptionist can be configured to automatically play the company voicemail greeting notifying callers that the company is closed. As another example, the auto-receptionist can be programmed to forward all incoming calls to the individual extension users during business hours, and to an operator after business hours.

As discussed above, existing users and departments associated with the identifier 543 can be displayed through the entity interface element 546. In some implementations, the entity interface element 546 can retrieve data previously entered in the username interface 510 and department assignment interface 520, and display a summary of those information in the configuration interface 540. As an example, if the user has previously defined two departments (e.g., via department assignment interface 520), the entity interface element 546 can include a department interface element 546a through which configuration information associated with the two departments can be accessed. As another example, where four extensions or extension users have been defined (e.g., via username interface 510), information associated with each extension user can be accessed by selecting the user interface element 546b.

In some implementations, the configuration interface 540 can be configured to automatically recognize the types of contact (e.g., a department or an extension user) based on, for example, the length of an extension number without requiring the account holder or administrator to pre-define a category to identify the type of associated extensions. As an example, extension assigned with a three-digit extension (e.g., ext "101") can be assigned to the "User" group while extensions assigned with an one-digit extension (e.g., ext "1") can be assigned to the "Department" group. In some implementations, the configuration interface 540 can automatically be configured to classify each extension based on the length of the extension so that extensions with a particular length (e.g., extensions with three digits) can be automatically grouped.

In some implementations, each interface element 546a/546b can display a total number of extensions assigned to that category/group. For example, the department interface element 546a can display "2 Departments" to indicate a total of two departments that have been assigned with an extension. As another example, the user interface element 546b can display "4 Users" to indicate a total of four users who have been assigned with an extension.

FIG. 6A shows an example of a user summary interface 610 that can be invoked upon receiving a user selection of the user interface element 546b. As shown in FIG. 6A, the user summary interface 610 can display one or more extension users and one or more extension numbers corresponding to the extension users. For example, extension user "John Smith" can be associated with extension 612a (e.g., extension "101"). Where there are four extension users, the user can configure each one of the respective extensions (e.g., the user can configure one or more call handling rules associated with each extension). In some implementations, only a subset of the extension users (e.g., greater or lesser than those shown) are displayed in the user summary interface 610.

In some implementations, at least one extension need be configured in order to complete the setup process. For example, configuration of the extension associated with the main user, account holder or administrator can be required before the setup process can proceed to the next phase.

If desired, the user can add one or more new extension users to the existing list of extension users. Upon selecting (e.g., clicking) the "Add User" button 614, a separate interface can be displayed that allows one or more new extension users to be added. In some implementations, where the user desires to add one or more new extension users, the user can be directed to a web browser window through which the one or more new extension users can be added. The user can also remove one or more of the existing extension users from the existing list displayed by the interface or browser window. For example, the user can select the edit button 616 to display a user interface (not shown) through which one or more existing extension users can be deleted from the existing list.

When a specific extension user is selected, in some implementations, a PBX profile associated with the selected extension user can be displayed through an extension user interface. For example, extension user "John Smith" at extension "101" can be selected from the user summary interface 610 to retrieve the virtual PBX profile and configuration data associated with extension user "John Smith". The retrieved virtual PBX profile and configuration data can then be displayed using the extension user interface. FIG. 6B shows an example of an extension user interface 620 for facilitating the configuration of one or more extension rules associated with an extension.

Referring to FIG. 6B, the extension user interface 620 can display one or more selectable interface elements 622, 624 and 626 through which profile and configuration data for extension user "John Smith" can be accessed and configured. In some implementations, each selectable interface elements 622-626 can be expandable and collapsible. For example, the user can select the user information interface element 622 to allow one or more fields associated with user account data for extension user "John Smith" to be displayed immediately below the user information interface element 622. Alternatively, a separate user interface can be displayed to the user for configuring the account data for extension user "John Smith".

FIG. 6C shows an example of a user information interface 630. As shown in FIG. 6C, account data associated with extension user "John Smith" can be automatically populated for extension "101" upon selecting the user information interface element 622. For example, the name and contact information for extension user "John Smith" can be automatically retrieved (e.g., from database 136 or from data previously entered in preceding interfaces) and displayed in all of the fields 632, 634 and 636. In some implementations, these fields 632-636 are editable. For example, the user can select the plusbox 638 to link one or more additional users to extension "101" associated with extension user "John Smith". As another example, a new or different extension can be assigned to extension user "John Smith" by modifying the extension number in the extension number field 632. For example, changing the extension number "Ext. 101" in the extension number field 632 to a new extension "Ext. 111" would connect incoming calls to extension user "John Smith" upon receiving a caller selection of the extension number "111".

In some implementations, the user can also select whether to include the extension user in the company directory. For example, the user can include the extension number and name of the extension user in the company directory by activating the "Include in Company Directory" button 639.

Referring back to FIG. 6B, upon activating the call forwarding interface element 624, one or more call forwarding rules associated with virtual PBX call forwarding can be revealed. FIG. 6D shows an example of a call forwarding interface 640 through which the one or more call forwarding rules can be defined. As shown in FIG. 6D, one or more types of forwarding numbers, such as a forwarding number 641b associated with a mobile device, a forwarding number 642b associated with "Work", a forwarding number 643b associated with "Home", or another type of forwarding number associated with "Other" type of device(s) 644 can be specified. In some implementations, the forwarding numbers 641b-643b can be manually entered or automatically populated (e.g., the forwarding numbers 641b-643b can be automatically populated based on the information submitted in the preceding interfaces). In some implementations, the information can be extracted from an address book application installed on the mobile device. A text prompt can also be displayed to request the forwarding numbers to be specified.

In some implementations, the forwarding numbers 641b-643b can be configured to ring sequentially (e.g., through option 646) or simultaneously (e.g., through option 645) when a caller calls the number of the user's mobile device. For example, the user can establish a call forwarding setting to allow devices associated with the call forwarding numbers 641b-643b to ring sequentially based on the orders in which the call forwarding numbers 641b-643b are listed (e.g., call forwarding number 642b can be configured with a higher priority than call forwarding number 643b but with a lower priority than call forwarding number 641b). As another example, a call forwarding setting can be established to allow devices associated with the call forwarding numbers 641b-643b to ring simultaneously (e.g., by selecting the option 645) so that devices associated with call forwarding numbers 641b-643b can be simultaneously rung at the time of receiving an incoming call to the user's mobile device.

In some implementations, one or more call forwarding rules can be initiated after a predetermined period. In some implementations, the predetermined period can be defined by the user. For example, an entry can be provided to receive a numeric entry indicating the time (e.g., in seconds) after which the call forwarding rules can be executed. As an example, after receiving an incoming call, the incoming call can be forwarded to a defined forwarding number of the user after three seconds.

In some implementations, to edit an existing call forwarding number, the user can simply select corresponding field 641a, 642a and 643a to invoke an edit forwarding phone number interface through which the user can add, modify or delete a forwarding number. Alternatively, the corresponding field 641a-643a can be modified on the fly (e.g., without the presentation of a separate interface for modifying the corresponding data).

In addition to call forwarding rules, the user can also configure parameters pertaining to call screening. To configure call screening parameters, the call screening interface element 625 can be selected to invoke a call screening interface (not shown) through which one or more call screening rules associated with virtual PBX call screening can be presented to the user for configuration. In some implementations, the call screening interface can present an option to the user for enabling or disabling the call screening rules. When active, the one or more call screening rules can be configured to direct incoming calls to one or more designated destinations. In some implementations, the destinations can depend upon the identity of the callers. For example, the call screening rules can be configured to forward incoming calls with identifiable and recognizable call identification telephone numbers ("caller IDs") directly to the user (or other extension users). The call screening rules can also be programmed to automatically forward calls with unrecognizable caller IDs to the voice mailbox of the user (or other extension users). The call screening rules further can be configured to forward other incoming calls from calling parties to other parties, or redirect designated calls to an operator. In some implementations, call screening can be accomplished using a look-up table that cross-references a caller identification number to a pre-defined destination.

As discussed above, call screening rules can be configured to forward calls with identifiable call identification telephone numbers directly to the user (or other extension users), while forwarding calls with unrecognizable call identification telephone numbers to the voice mailbox of the user. In some implementations, a caller identification feature can be used for identifying the telephone number from which the incoming call originates. Alternatively, the user (or administrator) can require each caller to identify the name of the caller before the incoming call can be forwarded.

For example, a caller with a blocked caller ID would need to specify the name of the caller under a "If callerID not present" option before the call can be connected. In some implementations, blocked calls connected to the number can be answered on the first ring, and an announcement or greeting can be played to notify the callers that blocked calls are not accepted and can only be connected once the caller has revealed the caller's identity. Other options such as the "If caller not in contact list" option and "screen all calls" option can also be provided. For example, upon selecting the "If caller not in contact list" option, callers not in a contact list of the extension user would need to specify the names of the callers. As another example, selecting the "screen all calls" option would require all callers, including callers with identifiable caller IDs and callers who are on the contact list of the user, to specify the names of the callers before the calls can be connected.

In addition to call screening and call forwarding rules, voicemail parameters associated with extension "101" can also be configured. When the voicemail interface element 626 is invoked, a voicemail greeting interface can be presented to the user. FIG. 6E shows an example of a voicemail greeting interface 650. As shown in FIG. 6E, the voicemail greeting interface 650 can present a default greeting selection 652. When selected, the default greeting option 652 allows a default voicemail greeting (e.g., a standard computer-generated greeting) that has been pre-selected or pre-programmed to be played when callers are connected to the user's voicemail through which messages can be recorded. In some implementations, the voicemail greeting can be tailored to a specific personal preference or a particular type of practice or business. In some implementations, the voicemail greeting interface 650 can also present a drop down list of greetings that the user can select as the default greeting.

In some implementations, a custom voicemail greeting can be specified by selecting the "custom" voicemail greeting option 654. In some implementations, a message box 659 can be displayed that allows the user to enter one or more lines of text for all or portions of a custom greeting, and the one or more lines of text can be converted into voice recording (e.g., with the assistance of text-to-speech software) that can be played to the caller. For example, a line of text in the message box 659 can state "You have reached the voicemail box of John Smith" that can be converted into voice recording such that upon connecting a caller to the voicemail of extension user "John Smith", the greeting "You have reached the voicemail box of John Smith" can be played to the caller.

In some implementations, the voicemail greeting interface 650 can include a user option 657 for playing or previewing all the voicemail greeting available or recorded before finalizing the selection. The selected voicemail greeting can be played when a call is connected to the user's voicemail. The user can cancel (e.g., using button 658) or save (e.g., using button 656) any changes made to the voicemail greeting rules in the voicemail greeting interface 650.

FIGS. 7A-7F show various exemplary interfaces associated with setting up one or more department extensions. In some implementations, the interfaces shown in FIGS. 7A-7F can be presented to the user upon selecting, for example, the department interface element 546a shown in FIG. 5D.

Referring to FIG. 7A, a departments interface 700 can be presented to the user that includes one or more departments already defined by the user (e.g., defined using the department assignment interface 520 during setup). As shown, the departments interface 700 can display three different departments established by the user; namely, a billing department 702a, a sales department 702b and a support department 702c. The departments interface 700 can also display the extension number corresponding to each department. For example, the billing department 702a can be associated with extension "Ext. 2" 704a; the sales department 702b can be associated with extension "Ext. 1" 704b; and the support department 702c can be associated with extension "Ext. 3" 704c.

Similar to user extensions, each department extension can also be configured individually to fit the needs of each department. FIG. 7B shows a department configuration interface 710 that can be invoked upon selecting one of the department extensions. As an example, upon selecting the sales department 702b, the department configuration interface 710 can be shown that allows the user to configure the calling parameters and rules associated with the sales department.

The department configuration interface 710 can display one or more selectable interface elements 712, 714, 716 and 718 through which profile and configuration data for the sales department can be accessed and configured. In some implementations, each selectable interface elements 712-718 can be expandable and collapsible. For example, the user or administrator can select the department information interface element 712 to allow one or more fields associated with account data for the sales department to be displayed immediately below the department information interface element 712. Alternatively, a separate user interface can be displayed to the user for configuring the account data for the sales department.

FIG. 7C shows a department information interface 720 that can be used to display account information associated with the sales department. As shown in FIG. 7C, account data associated with the sales department can be automatically populated for extension "Ext. 1" upon selecting the department information interface element 712. For example, the extension number, the department name and the main contact information for the sale department can be automatically retrieved (e.g., from database 136 or from data previously entered in preceding interfaces) and displayed in the extension number field 721, department name field 722 and department email address field 723, respectively. In some implementations, these fields 721-723 can be edited. For example, the user can select the email address field 723 to modify the existing email address for a department to another email address.

In some implementations, one or more extension users or department members associated with a department can also be displayed with the department information by the department information interface 720. For example, where four extension users are associated with the sales department, the department information interface 720 can display the name of each extension user and the corresponding extension below the department information. In the example shown, the department information interface 720 can display the name of extension users "Bob Jones", "Jane Doe", "John Smith", and "Tony Adams" and their associated extension numbers below the department information (e.g., immediately below the email address field 723). In some implementations, only a selected set of extension users is displayed (e.g., extension users with higher ranks in the department). In some implementations, the user can add or remove one or more department members by selecting the checkbox adjacent to the name of the extension user. For example, the user can select checkbox 724 to associate extension user "Bob Jones" with the sales department while deselecting checkbox 725 indicates that extension user "Jane Doe" is not to be associated with the sales department.

In some implementations, calls made to a department can be handled by the associated extension users in the order displayed by the department information interface 720. Alternatively, the user can be given the option to choose among one or more call handling options for handling incoming calls to the department. FIG. 7D shows an example of a call handling interface 730. In some implementations, the call handling interface 730 can be invoked upon selecting the call handling interface element 716 shown in FIG. 7B. As shown in FIG. 7D, the call handling interface 730 can display three options to the user for handling incoming calls to the department; namely; a "Rotating Order" option 732 (e.g., where each extension user rotates in handling incoming calls), a "Simultaneously" option 734 (e.g., where each incoming call is rung at each of the extensions of the extension users), and a "Longest Waiting" option 736 (e.g., where an incoming call is rung only at the extension of an extension user who has been waiting to handle an incoming call longer than any other individual extension user(s)). Other options can also be used. For example, the call handling interface 730 can include a "Sequentially in fixed order" option (e.g., where the calls are handled by each user in a fixed sequence), a "Fewest Number of Calls" option (e.g., where the user who has taken the least number of calls handles the next call(s)), and a "Skill Based" option (e.g., where the extension user with the skill most suitable or related to the user's query handles the call).

In some implementations, a specific department extension or the extension user (or operator) configured to receive all incoming calls made to the department may be preoccupied when an incoming call is received. For example, the extension user at the department extension may be on another active line where the incoming call can cause an undesirable disruption. The extension user may wish for the incoming call to be temporarily placed on hold. To do so, the department extension can be preset so that an on-hold action can be automatically performed when an incoming call is received. Alternatively, the call screening rules can be configured to allow the extension user to pick up the incoming call and place the incoming call on hold while attending another active call. While the caller is on hold, call screening rules can be configured, for example, to play on-hold music to the caller. The on-hold music can be used to indicate to the caller that the call is still active. To activate (or deactivate) the on-hold music, the user can select (or de-select) the specified music to be played under the on-hold music option 326i. The on-hold music option 326i can specify a desired genre associated with the on-hold music that can be played to the caller (e.g., rock, jazz, classical and the like).

When no one is available to take the incoming call to the department, the user can configure to either hold the caller in the queue until one of the extension users associated with the department becomes available (e.g., by selecting the "Hold the caller in queue" option 738) or transfer the incoming call directly to the department voicemail (e.g., by selecting the "Transfer call to voicemail" option 739). Where the "Transfer call to voicemail" option 739 is selected, the user can further be presented with an additional option to specify a maximum hold time (e.g., by selecting a time from the drop down menu 735) before the incoming call is routed to the department voicemail. For example, the user can select a period of two minutes from the drop down menu 735 to command the auto-receptionist to route all incoming calls to the department directly to the department voicemail after placing the caller on hold for two minutes. Other options also are contemplated. For example, in addition to the "Hold the call in queue" option 738 and the "Transfer call to voicemail" option 739, the user can also choose from "Play Announcement Only" option (e.g., where the auto-receptionist can be configured to play an automatic announcement previously recorded), a "Transfer to Queue" option (e.g., where the incoming call is placed in a queue until the next available agent or operator to take the call), and a "Ring a Number Only" option (e.g., where the incoming call is routed to a specific number or extension).

Similar to the greeting prompt that can be configured by each extension user, each department can also include an individualized greeting prompt for greeting callers who are making calls to the department (e.g., a department greeting can be played to a caller once the call is received by the department). Although not shown, a department voicemail greeting interface can be invoked (e.g., by selecting the greeting interface element 714) that allows a default department greeting to be played or custom department greeting to be created. In some implementations, a message box (e.g., one similar to message box 659) can be displayed that allows the user to enter one or more lines of text for all or portions of a custom department greeting, and the one or more lines of text can be converted into voice recording (e.g., with the assistance of text-to-speech software) that can be played to the caller.

In some implementations, the user can also configure parameters associated with the department voicemail (e.g., by clicking on the voicemail interface element 718). FIG. 7E shows an example of a department voicemail interface 740. As shown in FIG. 7E, the department voicemail interface 740 can display a voicemail greeting option 742. Selecting the voicemail greeting option 742 allows a voicemail greeting interface (not shown) to be displayed that allows a default voicemail greeting (e.g., a standard computer-generated voicemail greeting) to be played when callers are connected to the department's voicemail through which messages can be recorded. In some implementations, the department voicemail greeting can be customized to a specific department preference or a particular type of practice or business.

In addition to the voicemail greeting option 742, the department voicemail interface 740 can also present a voicemail recipient option 744. Once selected, the voicemail recipient option 744 can invoke a voicemail recipient interface that allows the user to identify one or more extension users that can receive department voicemails. FIG. 7F shows an example of a voicemail recipient interface 750. Referring to FIG. 7F, the voicemail recipient interface 750 can display all or portions of the names of the extensions users that the user can select for receiving department voicemails. The user can select one or more of the extension users displayed in the voicemail recipient interface 750 who will receive all department voicemails. In some implementation, department voicemails can be stored at the department mailbox by default to allow the selected (or non-selected) users to access all department voicemails.

Once the user has finished setting up all the extensions for the main number, the user can return to the configuration interface 540 shown on FIG. 5D. The configuration interface 540 can be presented as the final interface before the activation for the multi-extension virtual PBX service account. An indicator can be shown in each of the interface elements 542-546 to indicate to the user that configuration associated with the corresponding interface has been completed. In some implementation, the indicator can be shown when the "Done" button on the corresponding has been clicked (e.g., the "Done" button 627 shown in the extension user interface 620 of FIG. 6B). With a single click on the "Done" button, all the information previously entered in preceding interfaces can be sent to the TSP system 130, and the virtual PBX service account can then be activated accordingly. Once the virtual PBX service account is activated, the user can proceed to use the various functionalities provided by the virtual PBX services provider for this account.

Figure 8A:
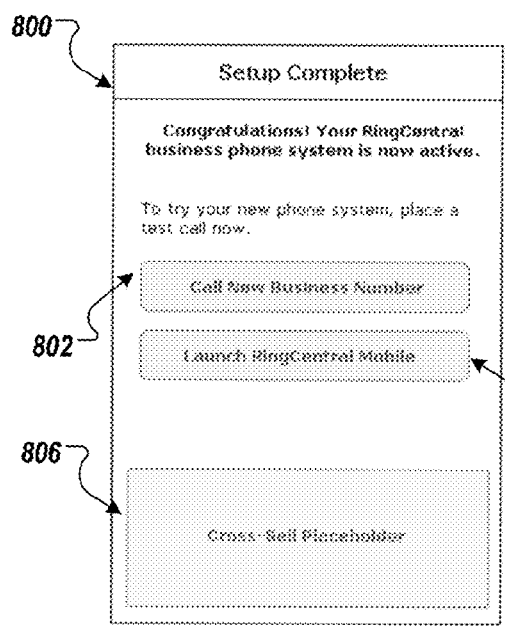
FIG. 8A shows an example of a complete notification.
Figure 8B:
FIG. 8B shows an example of a message interface.

Optionally, once the setup is complete, a setup complete notification can be displayed to the user. FIG. 8A shows an example of a complete notification 800. The complete notification 800 can notify the user that the account setup is complete and the new virtual PBX service account is now active for use. The complete notification 800 can also include a link 802 to allow the user to test the newly created phone number (e.g., business or local number depending on the user's selection from the number selection interface 420) by calling the new phone number to confirm its active status. The complete notification 800 can also present another link 804 to launch the mobile application that has now been activated upon completion of the setup. For example, upon clicking on the link 804, a message interface can be displayed on the user's mobile device that displays a welcome message containing, for example, instructions for using the mobile application. Upon clicking on link 806, a description of the promotional offering can be displayed for user to review and an option to choose the offer will be available. The user may choose to disregard the offer and proceed to the message interface 810. Accepting the offer will add the promotion to the user's service or take the user to an additional signup process. FIG. 8B shows an example of a message interface 810. The message interface 810 can also display various selectable functionalities that the user can access when making or receiving a call.

In some implementations, the message interface 810 can communicate with one or more portals in real-time (or near real-time) for retrieving messages (or message-related data) associated with the user, and can be used to store and display various types of messages. For example, the message interface 810 can communicate with a voice portal, a SMS portal, a network portal, a fax portal or an email portal for retrieving voicemail messages, text messages, network messages, faxes and emails associated with the user. In some implementations, the message interface 810 can also communicate with other communications platforms and portals for downloading messages associated with the user.

With respect to voicemails, when a caller calls the mobile number of the user and the call was not answered, a voicemail can be left at the server of the virtual PBX services. In some implementations, the voicemails can be downloaded to the mobile device as sound files prior to the user invoking the voicemail on the message interface 810. In some implementations, the voicemails can be transmitted to the mobile device as the user is listening to the voicemail. In some implementations, the availability of voicemail messages (along with other types of message) can be shown in the message interface 810 as a list. Optionally, the voicemails can be shown with the callers' names or numbers, the date and time of the voicemail messages, and optionally, the duration of the voicemail messages. Optionally, the name of the caller can be displayed if the caller's number already exists in the user's address book or if the caller's name is available through other look-up services.

In addition to audio messages, the message interface 810 can also process text messages in a manner similar to voice messages. In some implementations, the message interface 810 allows cross-platform messages to be sent and received. For example, the message interface 810 can integrate voice message services with instant message services, email services and fax services so that cross-platform messages can be viewed in a single thread or history. The message interface 810 can display messages from various callers and senders that are sent using various types of communications protocols. Specifically, the message interface 810 can display an instant message, a fax message, a voice message and network messages (e.g., a post or comment to a blog or social network profile associated with the user). To aid the user in quickly identifying the importance of each message, the message interface 810 can provide a snapshot of each message to be displayed together with the corresponding message. For example, the message interface 810 can display an instant message with a line of brief text summarizing the content of the instant message (e.g., a line of text that reads "Dinner for dad's birthday will be at six . . . "). It is also possible to present the entire message via a ticker presentation where the text can be streamed across the screen. Additionally, the streaming can be synchronized with voicemail playback to enable users to read-along as the message is played. Furthermore, speech-to-text capability can also be provided for playing the messages. For example, voicemail messages can be converted into text format using, for example, commercialized software to provide automated transcription or human-assisted transcription. Similarly, text-to-speech capability can also be provided to convert a text message into audio format that can be played when the user checks the text message.

As another example, the message interface 810 can display data pertaining to the time at which the message was received (e.g., "4:54 pm") as well as other relevant data (e.g., the number of pages faxed to the user (e.g., "5 pages")). As yet another example, the message interface 810 can display an alert (e.g., "has a new profile picture") for a network message alerting the user that a broadcast message has been received from a contact (e.g., from contact "Tony Lee") associated with the user via a particular social network and whose profile has been updated.

In some implementations, the message interface 810 allows the user to reply to any of the messages using any communications format. As an example, the message interface 810 can send voice-to-text replies or messages to a particular contact. As yet another example, the message interface 810 can send text-to-voice replies or messages to another user's mobile phone.

In some implementations, the service manager 134 can transmit a particular type of messages or respond to a message with a particular format (e.g., instant messages) by logging into the user's associated account(s) (e.g., user's instant message account). Where personal authentication is needed, the authentication data can be received in advance from the user (e.g., at the time of activating the account) and store in the database 136. When needed, the authentication information can be retrieved in order to log onto the user's account. As an example, the service manager 134 can generate voice messages based on instant messages. In order to send an instant-to-voice message, the user can log onto an associated instant message client, select the designated recipient from a buddy list affiliated with the instant message account, compose the message, and send the message to the service manager 134 using the message interface 810. The service manager 134 then can receive the message, and based on the identity of the recipient, identify the phone number associated with the recipient. Using the identified phone number, the service manager 134 can convert the instant message into a voice message, and deliver the voice message to the recipient by placing a call to the recipient and playing the voice message when the call is picked up by the recipient.

Further information regarding the foregoing cross-platform process can be found, for example, in co-pending U.S. Provisional Application Ser. No. 61/265,747, filed Dec. 1, 2009, entitled "Universal Call Management Platform," the disclosure of which is incorporated herein by reference in its entirety.

Figure 8C:
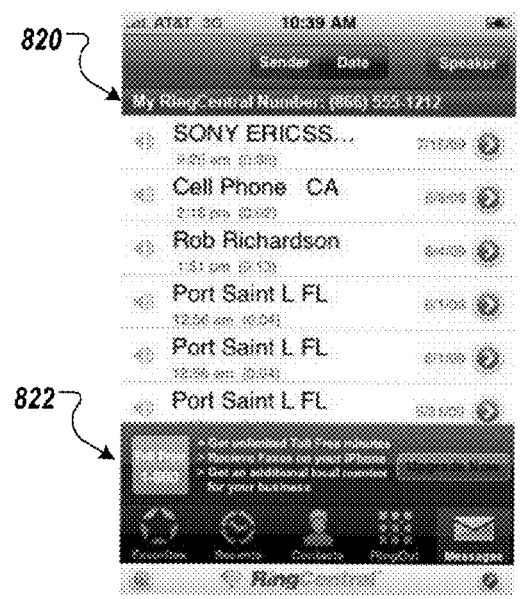
FIG. 8C shows an example of a banner.

In some implementations, the message interface 810 can also include a banner that can be displayed together with the messages. FIG. 8C shows an example of such a banner 822. As shown, the banner 822 can be an advertisement. In some implementations, the banner can include other types of messages such as announcements and other content.

FIGS. 9A-9F show examples of various user interfaces that can be used to configure/manage general settings for virtual PBX services after the user or administrator has setup and activated the virtual PBX services. The services activated can include a subset of pre-provisioned and pre-configured virtual PBX services, optionally customized based on information provided during the activation by the user. For example, a pre-provisioned service can include call forwarding to the contact number provided by the user or to multiple numbers according to call forwarding rules set by the user during activation.

In some implementations, the exemplary interfaces shown in FIGS. 9A-9F can be generated by the interface manager 135, and can be used to configure virtual PBX services for a single line. As discussed previously, a single-line virtual service can provide, for example, a main number, and calls made to the main number can be managed according to one or more sets of call handling rules that can be configured through the user interfaces. In some implementations, such call handling rules can include, but are not limited to, forwarding numbers/rules, call screening rules, voicemail rules, ring-out rules, and rules pertaining to other PBX functions and the like. A user or an administrator can access the user interfaces using the mobile application that was installed at the time of setting up the user account and which is available on the mobile device.

FIG. 9A shows a settings interface 900 for configuring general settings of a virtual PBX service account. The layout and function of the settings interface 900 are similar to the configuration interface 540 shown in FIG. 5D. For example, similar to the configuration interface 540, the settings interface 900 can display a main number interface element 902 (e.g., for adding, deleting or modifying existing company or user extensions as shown in the phone number interface 910 shown in FIG. 9B), an auto-receptionist interface element 904 (e.g., for adding, deleting or modifying existing rules associated with call handling or call assistance rules provided by the auto-receptionist), and an entity interface element 906 that includes a department interface element 906a (e.g., for adding, deleting or modifying existing rules associated with one or more departments), a user interface element 906b (e.g., for adding, deleting or modifying existing rules associated with one or more extension users), and a "More" interface element 906c (e.g., for adding, deleting or modifying existing rules associated with announcements, messages and faxes).

FIG. 9C shows an extension interface 920 that can be invoked when the department interface element 906a is selected. The extension interface 920 can display all of the existing departments and their corresponding extension. In some implementations, the user can access the extension interface 920 by selecting icon 922, or other interface elements by selecting any one of the icons in the panel 924. For example, the user can select icon 926 to access the user extension information (e.g., extension "John Smith" at extension "101"). As yet another example, the user can select icon 928 to display a list of all of the existing departments (e.g., which is also available by accessing the department interface element 906a), extension users (e.g., which is available by accessing the user interface element 906a), and any information associated with the "More" interface element 906c. FIG. 9D shows an example of a list 930 that includes all of the currently defined extensions, extension users and departments.

As shown in FIG. 9D, the list 930 can include a "Departments" section 932, an "Announcements" section 934, a "Fax on Demand" section 936, and a "Users" section 938. Each of the sections 932-938 can include all or portions of the extension users and corresponding extensions that have been established by the user during setup. Where only a portion of the extension users and extensions is shown, a plusbox can be used to expand the list 930 to display additional extension users and extensions associated with that section. For example, the plusbox 933, when selected, can expand the list of departments to include additional departments not shown on the list 930. In some implementations, after a section is expanded, the section can be collapsed to display only a selective number of extension users and extensions. For example, after activating the plusbox 933, the plusbox 933 can become a minus-box to indicate to the user that the "Departments" section 932 can be collapsed to reduce the viewing area.

As another example, the user can select icon 927 on the extension interface 920 to display information not associated with extension users or departments such as information associated with, for example, announcements, messages and faxes, as shown in FIG. 9E. As an example, an extension can be configured specifically for announcement, which when dialed, a pre-recorded announcement can be played to the caller to that extension. FIG. 9F shows an announcement configuration interface 950 for configuring rules associated with announcement. As shown in FIG. 9F, the user can input an extension under the "Extension Number" field 952 and a name for the extension under the "Extension Name" field 954. After completing these fields 952 and 954, the user can proceed to record a message that can be played as an announcement to the callers. To record, the user can select the "Record" button 958. Recorded announcements can also be previewed by selecting the "Play" button 956.

FIGS. 10A-10F show examples of various user interfaces that can be used to configure/manage personal settings associated with inbound calls for an extension user. As shown in FIG. 10A, the personal setting interface 1000 can become available to a user after successful authentication (e.g., where the user or the administrator has successfully logged into the mobile application). In some implementations, where the person accessing the mobile application is an extension user (e.g., as determined based on login information and associated profile or credential), the extension user can be presented with options for configuring an associated extension (e.g., "My Inbound", "My Outbound", "Business Hours", and "About"), while general or company settings (e.g., "Company" and "Business Hours") can be disabled). In some implementations, where the person accessing the mobile application is an administrator of the mobile account, the administrator can be given the privilege and credential to add, delete or modify any of the existing configuration(s) including, for example, those associated with the company and/or each of the extension users. The personal setting interface 1000 can display one or more selectable interface elements 1002-1008 through which profile and configuration data for extension user "John Smith" can be accessed. In some implementations, each selectable interface elements 1002-1008 can be expandable and collapsible. For example, the administrator can select the interface element 1002 to allow one or more fields associated with user account data for extension user "John Smith" to be displayed immediately below the extension interface element 1002. Alternatively, the user account data can be shown in a separate personal user information interface 1010. FIG. 10B shows an example of a personal user information interface 1010.

In some implementations, parameters for the extension rules associated with extension user "John Smith" can be automatically populated for extension "101" once the extension interface element 1002 has been selected. For example, the name and the contact information for extension user "John Smith" can be automatically retrieved (e.g., from database 136) and displayed in all of the fields 1012, 1014 and 1016. In some implementations, these fields 1012 1014 and 1016 are editable.

To facilitate the identification of an extension, an extension name field 1014 through which an extension name by which a caller can refer to the extension can also be provided. For example, the extension name for the extension number "Ext. 101" can be the name of the extension user "John Smith", and when a caller wishes to be connected to "John Smith" after being presented the option, the call can be routed to the extension number "101".

In some implementations, a direct number for extension user "John Smith" can be added via the direct number field 1018. The direct number can be used in place of the extension to directly connect to extension user "John Smith". For example, an incoming call can dial "415-555-1212" to connect to extension user "John Smith" at extension "101". If desired, more than one direct number can be specified for extension user "John Smith". For example, a second direct number "415-555-1111" can be defined for extension user "John Smith" that allows callers to be directly connected to extension user "John Smith" at extension "101" by dialing "415-555-1111".

If more than one direct number is added, configuration data can include one or more rules to select a direct number for use with the extension "101" in different situations. For example, the direct number presented in the direct number field 1018 can be used as the primary direct number, and any additional direct numbers can be used as alternate numbers if the primary direct number is in use or otherwise unavailable. In some implementations, the direct number presented in the direct number field 1018 can be a toll-free number. Where more than one direct number is added, a combination of toll-free numbers and local numbers can be used.

The user can also be given the option to include the user profile information in a company directory. For example, enabling the company directory option 1019*a* allows extension user "John Smith" to publish its extension user information in a company directory that can be broadcast to callers while searching for extension user "John Smith".

The personal user information interface 1010 can also present an administrative privileges field 1019*b* that allows administrate privileges to be assigned to extension user "John Smith". Where the extension user is given administrative privileges, in some implementations, the extension user can access and modify profiles and configuration data associated with other extension users associated with the main number.

Depending on the type of virtual PBX services enrolled and activated by extension user "John Smith", the personal setting interface 1000 can display one or more pre-provisioned and pre-configured virtual PBX services, optionally customized and configured based on information provided during the activation by the user. For example, the personal setting interface 1000 can display one or more interface elements each pertaining to a different call handling rule. In the example shown, the user has selected a pre-provisioned service that includes call screening for screening all incoming calls to the user. Configuration parameters associated with the call screening can be accessed through the selection of the call screening interface element 1020. As another example, in addition to the call screening interface element 1004, the personal setting interface 1000 can display selectable interface elements associated with calling forwarding, voicemail, ring-out, call blocking, privacy director, call waiting, call conferencing, speeding dialing, call recording, queue rules, do-not-disturb and other PBX functions and the like.

When call screening service is selected by the user (e.g., through the selection of the call screening interface element 1004), the user can be presented with options associated with configuring call screening parameters for business hours and after hours. FIG. 10C shows an example of a personal call screening interface 1020. The personal call screening interface 1020 can be accessed by selecting the call screening interface element 1004 on the personal setting interface 1000. As shown in FIG. 10C, the personal call screening interface 1020 can include an introductory greeting field 1022 that can present an option (e.g., ON/OFF option) for enabling or disabling an introductory greeting played to a caller when the caller places a call to the mobile device of the user. After the introductory greeting has been played, the caller can then be connected to the user, or alternatively, be routed based on the existing call handling rules (e.g., to one or more call forwarding numbers previously defined by the user).

Where the introductory greeting is enabled, a default greeting or a customized greeting can be selected using a prompt menu. In some implementations, activating the prompt menu invokes an introductory greeting interface (not shown) that can be used to specify one or more greeting rules. The introductory greeting interface can include a default greeting option that allows a default message (e.g., a standard computer-generated greeting) that has been pre-selected or pre-programmed to be played at the time of receiving a call from a caller to the main number. In some implementations, the greeting can be personally tailored. In some implementations, the introductory greeting interface can present a drop down list of greetings that the administrator/extension owner can select as the default greeting.

The introductory greeting interface can also include a custom greeting option that allows voice greeting to be recorded in advance. In some implementations, a line of text can be entered in a text field provided by the introductory greeting interface for all or portions of a custom greeting, and the line of text can be converted into voice recording (e.g., with the assistance of text-to-speech software) that can be played to the caller.

As discussed above, the call screening rules can be configured to forward calls with identifiable call identification telephone numbers directly to an extension user, while forwarding calls with unrecognizable call identification telephone numbers to the voice mailbox of the extension user. In some implementations, a caller identification feature can be used for identifying the telephone number from which the incoming call originates. Alternatively, the administrator can require each caller to identify the name of the caller before the incoming call can be forwarded. If desired, the call screening feature can be disabled via the call screening field 1024.

While the foregoing implementations are described with respect to call screening rules executed during business hours, similar or different call screening rules can also be configured for after business hours. For example, as shown in FIG. 10D, call forwarding rules provided by the personal call forwarding interface 1030 (e.g., similar to those configured during setup as shown in FIG. 6D) can also be configured for after hours.

In addition to settings pertaining to incoming calls, settings pertaining to outbound calls can also be added, deleted or modified by the user. FIG. 10E shows an example of an outbound interface 1040 that can be presented to the user when the outbound interface element 1042 is selected. Referring to FIG. 10E, the outbound interface 1040 can be used to configure one or more setting parameters associated with outbound calls. As shown, the outbound interface 1040 can include a caller ID field 1044 and a ringout field 1046. Optionally, though not shown, the outbound interface 1040 can also include an international calling field through which a particular carrier or service can be selected for establishing international calls.

The caller ID field 1044 allows the mobile number of the user from which outbound calls originate to be displayed on the devices of the called party. The ringout field 1046 provides a ringout function where the mobile user using the virtual PBX services application can dial an outside telephone number (a number external to the PBX) via the virtual PBX application, and have the call on the called party's end appear to have originated from a different number associated with the user. Additionally, the ringout function can allow the user using the virtual PBX services application to dial an outside telephone number (a number external to the PBX) via the virtual PBX application, and have the call on the callee's end appear to have originated from the main number of the account. Even further, the ringout function allows the user to specify a different device to receive calls made to the user's mobile device. As an example, with the ringout function enabled, the user can take calls made to the user's mobile device (e.g., 415-555-1212) at the office (e.g., 800-123-4567). The user can also define a number where the call is to be rung first (e.g., instead of the device having the number being called), and when the user answers, calls the party.

In some implementations, when the ringout option is invoked by a user, a dial pad can be presented to the user. The user can enter a telephone number he wishes to reach by pressing the numbers on the dial pad (or by entering the numbers by pressing the hardware keys present on the mobile device). After the number is entered, the user can press a "Call" button on the display or the mobile device to call that number. The virtual PBX server can receive this call via one or more communications networks, proceed to call that number entered by the user, and subsequently connect the two calls while generating the appearance that the call originates from the main number of the account. In some implementations, the user can choose to have a different number than the main number of the account appears as the originating number.

In some implementations, the ringout feature can also include a button for invoking an address book application on the mobile device. In some implementations, the user can enter a phone number to ringout directly from the address book by selecting that number. In some implementations, the user can dial a number presented in a web-browsing application, or other applications on the mobile device by highlighting that number and clicking on a designated button provided by the virtual PBX application. In some implementations, the ringout interface can include a button for the user to cancel the ringout attempt before the call is made (e.g., the button with a circle and cross on it).

Figure 11:
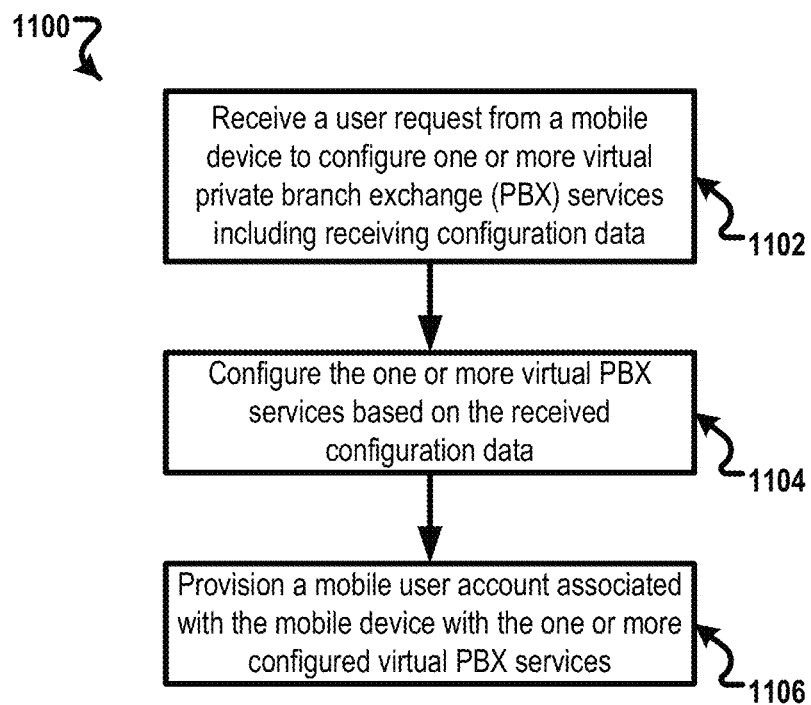
FIG. 11 shows an example of a process for provisioning a mobile user account with one or more virtual private branch exchange services.

FIG. 11 shows an example of a process for provisioning a mobile user account with one or more virtual private branch exchange services. Referring to FIG. 11, process 1100 begins with receiving a user request from a mobile device to configure one or more virtual private branch exchange (PBX) services including receiving configuration data (1102). The one or more virtual PBX services can be configured based on the received configuration data (1104). A mobile user account associated with the mobile device can be provisioned with the one or more configured virtual PBX services (1106).

Operations 1102-1106 can be performed in the order listed, or in parallel (e.g., by the same or a different process, substantially or otherwise non-serially).

Computer Devices

Figure 12:
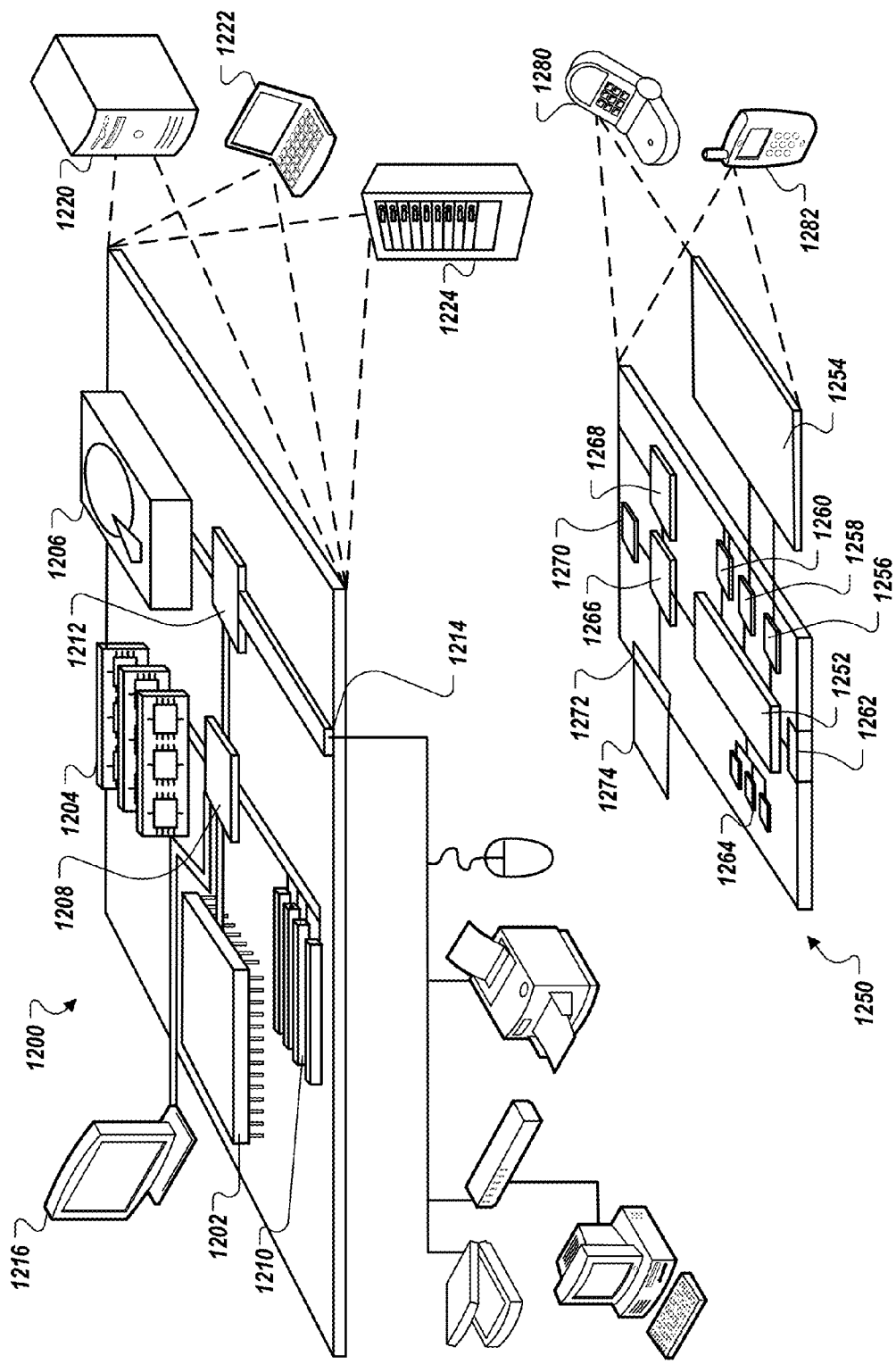
FIG. 12 is a block diagram of computing devices that can be used to implement processes and methods described in relation to the call management system shown in FIG. 1.

FIG. 12 is a block diagram of computing devices 1200, 1250 that may be used to implement the systems and methods described in this document, as either a calling device or receiving device. Computing device 1200 can represent various forms of digital computers, such as laptops, desktops, workstations, personal digital assistants, servers, blade servers, mainframes, and other appropriate computers (e.g., user terminal 126). Computing device 1250 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

As shown in FIG. 12, computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer-or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communication audibly using audio codec 1260, which may receive spoken information from a user and convert it to usable digital information. Audio codex 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method comprising:
configuring a placeholder virtual private branch exchange (vPBX) account that is not activated or associated with any user, wherein configuring the placeholder vPBX account comprises associating the placeholder virtual PBX account with a subset of pre-provisioned vPBX services;
providing, for presentation on a mobile device, a user interface for activating a vPBX account on the mobile device; and
while the user interface for activating a vPBX account is presented on the mobile device:
receiving, through the user interface, a request to activate a new vPBX account on the mobile device, and
activating, by associating an identifier for the new vPBX account with the placeholder vPBX account that had previously not been activated or associated with any user, the new vPBX account on the mobile device and provisioning the new vPBX account with the pre-provisioned vPBX services to enable the pre-provisioned vPBX services to be used on the mobile device.

2. The method of claim 1, wherein the identifier is a phone number for the mobile device.

3. The method of claim 1, further comprising:
facilitating a call session on the mobile device using the vPBX services.

4. The method of claim 1, further comprising:
receiving, through the user interface, a selection of an identifier for the new vPBX account.

5. The method of claim 4, wherein receiving the selection of the identifier comprises receiving the selection of the identifier from a presentation of a plurality of possible identifiers for the new vPBX account that are not yet associated with any vPBX accounts.

6. The method of claim 1, further comprising:
configuring one or more other placeholder vPBX accounts, wherein each other placeholder vPBX account is associated with a different subset of pre-provisioned vPBX services.

7. The method of claim 6, further comprising:
providing a presentation identifying a plurality of new account options in the user interface, each new account option being associated with a different placeholder vPBX account; and
wherein receiving a request to activate the new vPBX account comprises receiving a selection of one of the new account options through the user interface.

8. The method of claim 7, wherein associating the identifier for the new vPBX account with the placeholder vPBX account comprises associating the identifier for the new vPBX account with a placeholder vPBX account that is associated with the selected new account option.

9. A system comprising one or more computers and one or more storage devices storing instructions that when executed by the one or more computers cause the one or more computers to perform operations comprising:
configuring a placeholder virtual private branch exchange (vPBX) account that is not activated or associated with any user, wherein configuring the placeholder vPBX account comprises associating the placeholder virtual PBX account with a subset of pre-provisioned vPBX services;

providing, for presentation on a mobile device, a user interface for activating a vPBX account on the mobile device; and while the user interface for activating a vPBX account is presented on the mobile device:

receiving, through the user interface, a request to activate a new vPBX account on the mobile device, and activating, by associating an identifier for the new vPBX account with the placeholder vPBX account that had previously not been activated or associated with any user, the new vPBX account on the mobile device and provisioning the new vPBX account with the pre-provisioned vPBX services to enable the pre-provisioned vPBX services to be used on the mobile device.

10. The system of claim 9, wherein the identifier is a phone number for the mobile device.

11. The system of claim 9, the operations further comprising:

facilitating a call session on the mobile device using the vPBX services.

12. The system of claim 9, the operations further comprising:

receiving, through the user interface, a selection of an identifier for the new vPBX account.

13. The system of claim 12, wherein receiving the selection of the identifier comprises receiving the selection of the identifier from a presentation of a plurality of possible identifiers for the new vPBX account that are not yet associated with any vPBX accounts.

14. The system of claim 9, the operations further comprising:

configuring one or more other placeholder vPBX accounts, wherein each other placeholder vPBX account is associated with a different subset of pre-provisioned vPBX services.

15. The system of claim 14, the operations further comprising:

providing a presentation identifying a plurality of new account options in the user interface, each new account option being associated with a different placeholder vPBX account; and wherein receiving a request to activate the new vPBX account comprises receiving a selection of one of the new account options through the user interface.

16. The system of claim 15, wherein associating the identifier for the new vPBX account with the placeholder vPBX account comprises associating the identifier for the new vPBX account with a placeholder vPBX account that is associated with the selected new account option.

17. A non-transitory computer storage medium having stored thereon instructions that when executed by one or more computers cause the one or more computers to perform operations comprising:

configuring a placeholder virtual private branch exchange (vPBX) account that is not activated or associated with any user, wherein configuring the placeholder vPBX account comprises associating the placeholder virtual PBX account with a subset of pre-provisioned vPBX services;

providing, for presentation on a mobile device, a user interface for activating a vPBX account on the mobile device; and while the user interface for activating a vPBX account is presented on the mobile device:

receiving, through the user interface, a request to activate a new vPBX account on the mobile device, and activating, by associating an identifier for the new vPBX account with the placeholder vPBX account that had previously not been activated or associated with any user, the new vPBX account on the mobile device and provisioning the new vPBX account with the pre-provisioned vPBX services to enable the pre-provisioned vPBX services to be used on the mobile device.

18. The computer storage medium of claim 17, wherein the identifier is a phone number for the mobile device.

19. The computer storage medium of claim 17, the operations further comprising:

facilitating a call session on the mobile device using the vPBX services.

20. The computer storage medium of claim 17, the operations further comprising:

receiving, through the user interface, a selection of an identifier for the new vPBX account.

* * * * *